US007353849B2

(12) United States Patent
Schroeder et al.

(10) Patent No.: US 7,353,849 B2
(45) Date of Patent: Apr. 8, 2008

(54) EVACUATION SYSTEM

(75) Inventors: Alfred A. Schroeder, San Antonio, TX (US); Michael T. Romanyszyn, San Antonio, TX (US); Merrill R. Good, San Antonio, TX (US); John D. Santy, Converse, TX (US); George E. Hernandez, San Antonio, TX (US); Ronald Ray Hoch, San Antonio, TX (US)

(73) Assignee: Lancer Partnership, Ltd., San Antonio, TX (US)

( * ) Notice: Subject to any disclaimer, the term of this patent is extended or adjusted under 35 U.S.C. 154(b) by 0 days.

(21) Appl. No.: 11/418,426

(22) Filed: May 4, 2006

(65) Prior Publication Data

US 2006/0254673 A1 Nov. 16, 2006

Related U.S. Application Data

(62) Division of application No. 10/828,482, filed on Apr. 20, 2004, now Pat. No. 7,086,428.

(60) Provisional application No. 60/519,878, filed on Nov. 13, 2003, provisional application No. 60/467,043, filed on May 1, 2003, provisional application No. 60/467,042, filed on May 1, 2003.

(51) Int. Cl.
*B65B 1/04* (2006.01)
(52) U.S. Cl. ............................ 141/114; 141/65; 222/95; 222/181.1
(58) Field of Classification Search ................ 141/65, 141/67, 218, 114; 222/95, 101, 102, 105, 222/181.1
See application file for complete search history.

(56) References Cited

U.S. PATENT DOCUMENTS

| 3,946,904 | A | * | 3/1976 | Mulakala ..................... 222/102 |
| 5,833,120 | A | * | 11/1998 | Evans et al. .................. 222/95 |
| 6,345,734 | B2 | * | 2/2002 | Schalow et al. ............. 222/103 |
| 6,364,165 | B2 | * | 4/2002 | Sampson et al. ........... 222/102 |
| 6,533,145 | B2 | * | 3/2003 | Lewis et al. ............. 222/181.3 |
| 7,086,428 | B2 | * | 8/2006 | Schroeder et al. ............ 141/65 |

\* cited by examiner

*Primary Examiner*—Steven O. Douglas
(74) *Attorney, Agent, or Firm*—Christopher L. Makay

(57) ABSTRACT

An evacuation system including an evacuation member engages a product package and applies pressure thereto, such that a product in the product package moves toward an outlet in the product package for dispensing. A controller monitors the force applied by a driver to the product package, thereby ensuring that the pressure remains below a particular threshold to protect the integrity of the product package. The controller further monitors the evacuation member location, thereby enabling the controller to recognize when the product package is empty. The evacuation system further includes a package carrier including a pinch-off area that moves product out of an unrecoverable portion of the product package. The evacuation member may be utilized as a stand-alone device or with a primary device, wherein the primary device provides signals to the evacuation system and the evacuation system provides product to the primary device.

4 Claims, 35 Drawing Sheets

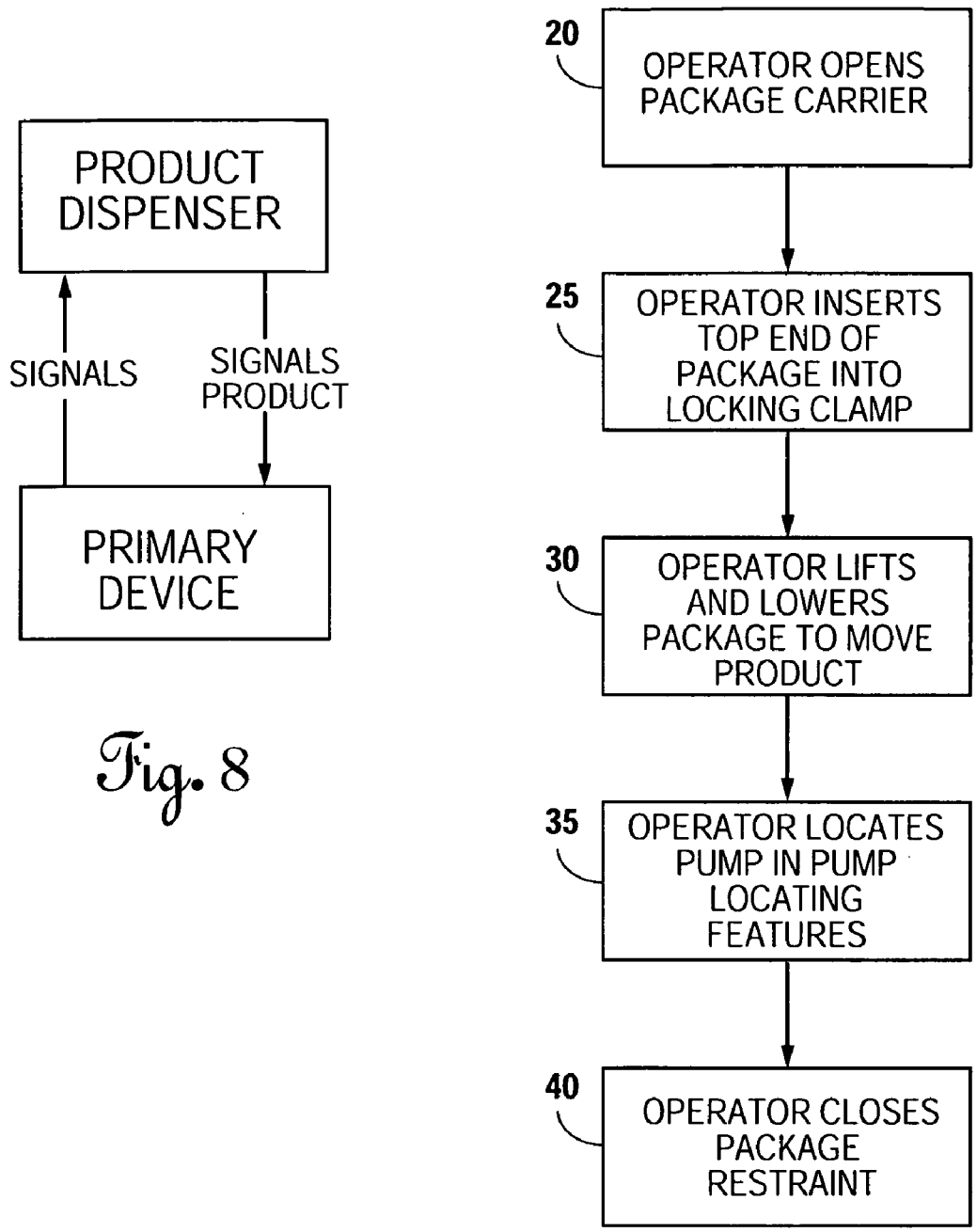

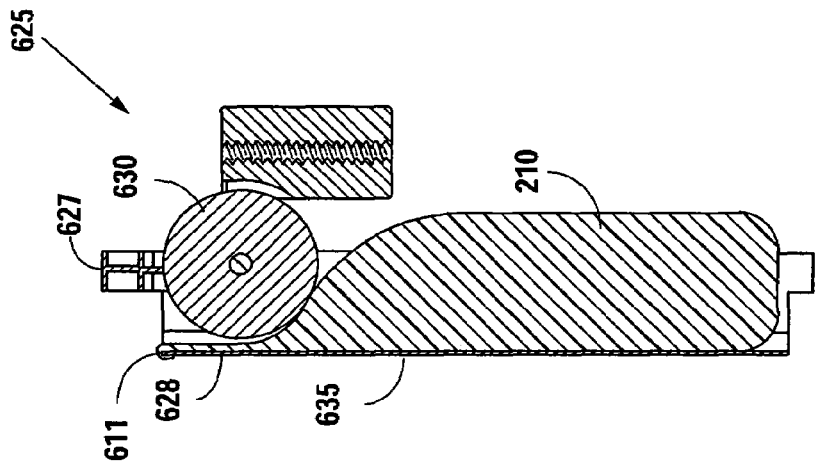
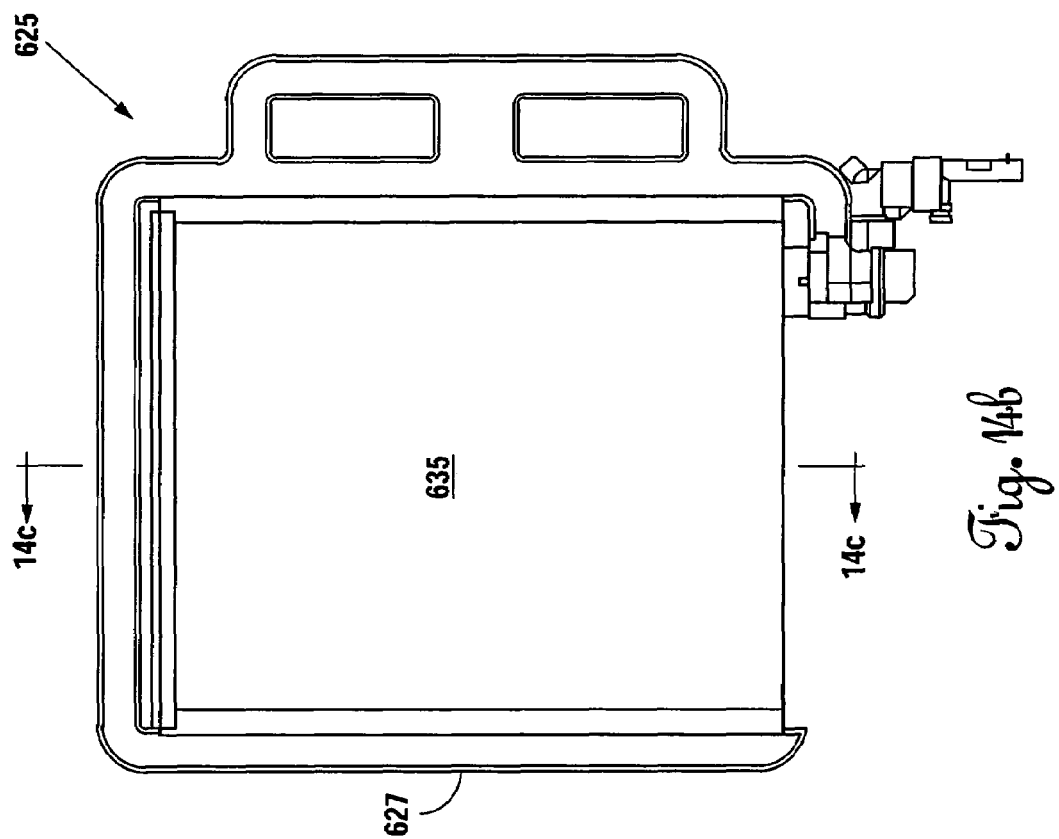

EVACUATION SYSTEM

RELATED APPLICATION

This application is a divisional application of Ser. No. 10/828,482 which was filed on Apr. 20, 2004 now U.S. Pat. No. 7,086,428.

The present application claims all available benefit, under 35 U.S.C. 119(e), of U.S. provisional patent application Ser. No. 60/519,878, filed Nov. 13, 2003, and U.S. provisional patent application Ser. No. 60/467,042, filed May 1, 2003. By this reference, the full disclosures of U.S. provisional patent application Ser. No. 60/519,878 and U.S. patent application Ser. No. 60/467,043 are incorporated herein as though now set forth in its entirety.

BACKGROUND OF THE INVENTION

Field of the Invention

The present invention relates to a method and apparatus for dispensing and, more particularly, but not by way of limitation, to a method and apparatus for dispensing food products and food product concentrates, such as pizza sauce, soft ice cream, mustard, ketchup, mayonnaise, soup, salad dressing, juice concentrates, and the like.

Background of the Invention

The viscosity of food products varies widely and ranges from relatively hard (e.g., soft ice creams) to semi-liquids (e.g., pizza sauce, ketchup, and mustard) to liquids (e.g., soups). Problems associated with viscous products or soups that contain solids arise because an employee or a customer typically manually dispenses such products. These problems relate to product remnant, consistency, quality, cost, cleanliness, and the like.

For example, ketchup and mustard usually have separate dispensers that each consist of a container having a pump. Although employees do not directly dispense ketchup and mustard, an employee must fill the dispensers when they are empty. This results in direct employee contact with both the dispensers and the food products. If the dispensers are not routinely cleaned or are cleaned improperly, an unsanitary condition situation arises.

As an alternative to the possibility of contamination, some food products, such as pizza sauce or soup, come in concentrate packages, therein providing sanitary product in a cost-effective film technology package commonly known as a soft package. Soft packages are routinely used with pumps, and work well with low viscosity fluids as they may be evacuated with an industry standard of approximately ninety two percent. However, viscous products present other problems because the product is not conducive to being evacuated with a pump. In such cases, the evacuation efficiency of a package with a viscous product is approximately seventy to eighty percent.

For a viscous product, an employee must open the concentrate package and empty the package into a large, typically open container. The employee then adds water and mixes the concentrate and water to form the final product. Then, as needed for final preparation or consumption, an employee or customer ladles the final product from the large open container. Thus, the final product can remain uncovered for long periods and employees or customers often contact the final product, both of which are unsanitary.

Manual dispensing of food products occurs because heretofore the cost for dispensers and operational costs of such dispensers suitable to dispense viscous products has been prohibitive. Accordingly, a product dispenser and a method of dispensing food product are needed that permit self-contained dispensing of food products and food product concentrates, such as pizza sauce, soft ice cream, mustard, ketchup, mayonnaise, soup, salad dressing, and the like, while providing a high percentage of evacuated product, therein reducing waste.

SUMMARY OF THE INVENTION

In accordance with the present invention, an evacuation system including an evacuation member engages a product package and applies pressure thereto, such that a product in the product package moves toward an outlet in the product package for dispensing. The evacuation member is driven by a motor. A controller monitors the force applied to the product package to maintain the pressure below a particular threshold, thereby ensuring that the product package is not ruptured. The controller further monitors the evacuation member location, thereby enabling the controller to recognize when the product package is empty.

The evacuation system further includes a package carrier for product package loading ease. The package carrier further includes a pinch-off area that moves product out of an unrecoverable portion of the product package. The evacuation system may still further include a pump connectable to the product package and a driver that actuates the pump to evacuate product from the product package.

The evacuation member may be utilized as a stand alone device or may be utilized with a primary device, wherein the primary device provides signals to the evacuation system and the evacuation system provides product to the primary device.

It is therefore an object of the present invention to provide an evacuation system for evacuating a product from a product package.

It is a further object of the present invention to provide a package carrier capable of aiding in the evacuation process.

It is still further an object of the present invention to provide an evacuation system capable of operating with a primary device to accept signal therefrom and deliver product thereto.

It is still yet further an object of the present invention to increase the evacuation efficiency of product packages.

It is still yet further an object of the present invention to apply a same force to all product packages in like drive bays.

Still other objects, features, and advantages of the present invention will become evident to those of ordinary skill in the art in light of the following. Also, it should be understood that the scope of this invention is intended to be broad, and any combination of any subset of the features, elements, or steps described herein is part of the intended scope of the invention.

BRIEF DESCRIPTION OF THE DRAWINGS

FIG. 8 illustrates the product dispenser working with a primary device.

FIG. 9 is a method flowchart for the insertion of a package into the package carrier.

FIG. 14b provides a side view of the single weighted roller unit according to the alternative embodiment.

FIG. 14c provides a section view of the single weighted roller unit according to the alternative embodiment.

DETAILED DESCRIPTION OF THE PREFERRED EMBODIMENT

Figure 1A:
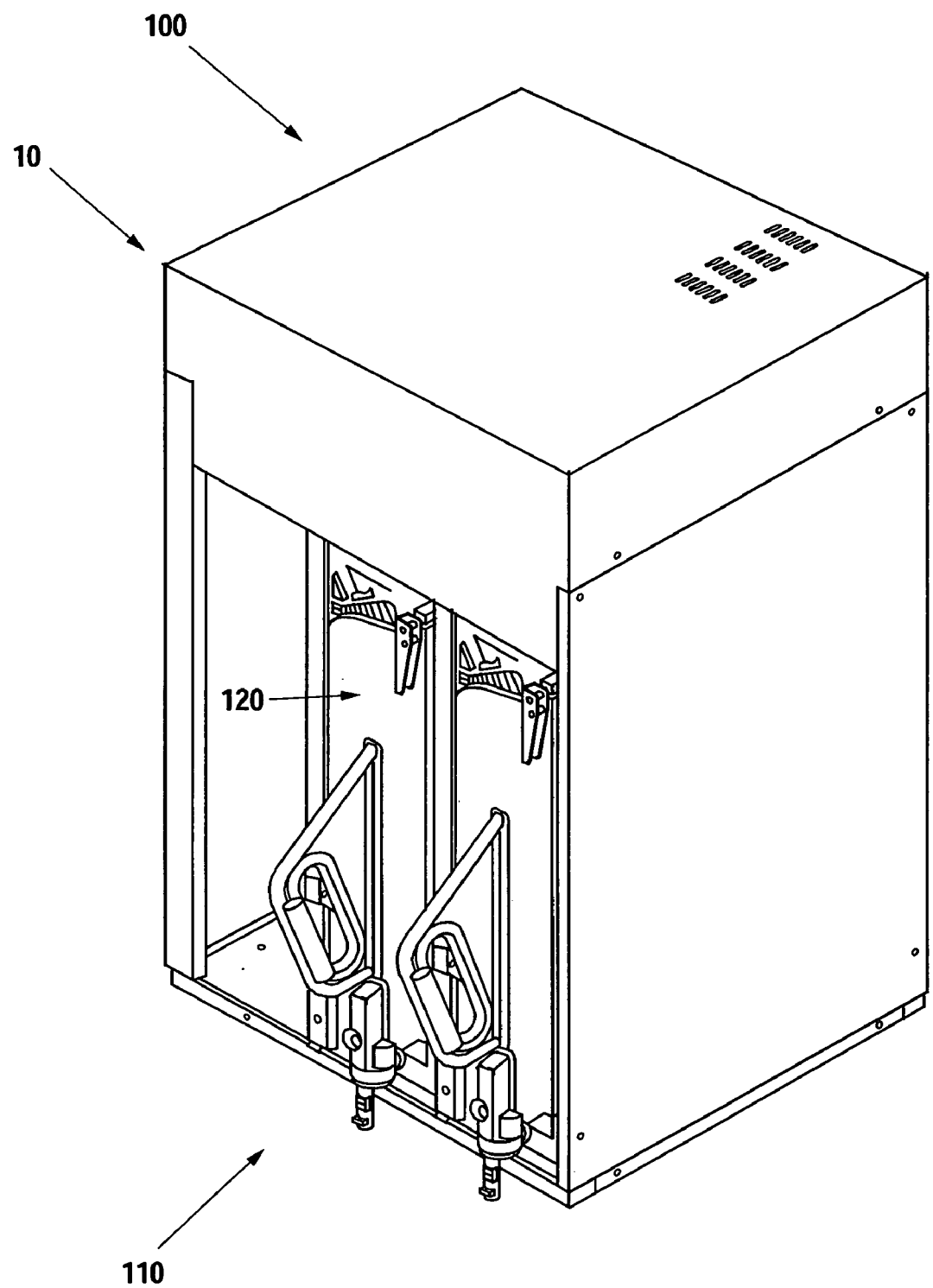
FIG. 1a is a perspective view illustrating a product dispenser according to the preferred embodiment.

As required, detailed embodiments of the preferred invention are disclosed herein; however, it is to be understood that the disclosed embodiments are merely exemplary of the invention, which may be embodied in various forms. It is further to be understood that the figures are not necessarily to scale, and some features may be exaggerated to show details of particular components or steps.

The invention that follows is an evacuation system for food type products that may be stored in a soft package. The apparatus and methods that follow pertain specifically to evacuation of soft packages, including viscous products. The product dispenser may be used with an external device or may be used as a stand-alone dispenser. The evacuation system may be configured to accommodate varying package types and sizes. Use of the product dispenser may or may not require the use of a product pump.

As illustrated in FIGS. 1-7f, a product dispenser 10 includes a housing 100, at least one product dispensing station 110 and at least one product package carrier 120. The product dispensing station 110 receives a product package carrier 120 that houses a disposable product package 210. The dispensing station 110 further includes an evacuation member 133 that facilitates the removal of product from the product package 210. In the preferred embodiment, the product package 210 is coupled to a disposable pump 220 for dispensing product from the product package 210. In an alternative embodiment, the product package 210 could be coupled to an end user and a primary device. The dispensing station 110 of the product dispenser 10 may be used to reconstitute a concentrate and dispense the reconstituted product or to dispense a single strength product.

In embodiments utilizing a pump 220 with the product package 210, the product dispenser 10 includes a pump driver 141 that drives a piston 222 of the pump 220 to facilitate the dispensing of product from the product package 210. The pump 220 in this preferred embodiment is a reciprocating piston type pump commonly associated with product dispensing. Particularly, the pump 220 is of the type previously disclosed in U.S. Pat. No. 6,193,109, which issued Feb. 27, 2001. Advantages of the disclosed pump include the ability to slide a package/package container into a product dispenser from the front side. In this arrangement, the pump drive connections and the diluent connections are connected in a single loading motion. Although this preferred embodiment discloses a reciprocating piston type pump, any suitable alternative, such as a progressive cavity pump, may be used.

The pump 220 includes an inlet 223 suitable for connection with the product package 210 and an outlet 351 suitable for connection with a mixing chamber 352. The mixing chamber 352 in turn connects to a dispensing outlet 353 via a tube 354. Although this embodiment discloses a dispensing outlet 351, the mixing chamber 352 may connect to any other suitable end product delivery device, such as a pizza sauce spreader and the like. The mixing chamber 352 includes a diluent inlet 355 connected to a diluent source that delivers a diluent (e.g. water) into the mixing chamber 352. The mixing chamber 352 includes a mixing device suitable to facilitate the combining of the product and diluent. Consequently, the pump 220 delivers product, typically in concentrate form, into a mixing chamber 352, and a diluent source delivers diluent into the mixing chamber 352 via a diluent inlet 355, resulting in the product and diluent combining in the mixing chamber 352 to form an end product dispensed from a dispensing outlet 353. Although a mixing chamber 352 has been disclosed; those of ordinary skill in the art will recognize that the pump 220 may directly connect to the dispensing outlet 353 when the product does not require a diluent or when mixing before dispensing is not required.

To ensure desired mixed concentrations of product and diluent, a suitable flow control device may be provided between the diluent source and the diluent inlet 355, and the pump driver 141 could be controlled to operate the pump 220 at a preset rate. Alternatively, a suitable flow measuring device could be provided between the diluent source and the diluent inlet 355. The flow measuring device measures diluent flow to produce a signal thereof, which is used to control the pump driver 141 and drive the pump 220 such that the pump 220 delivers a desired amount of product for combination with diluent.

The product package 210 in this preferred embodiment includes a bag coupled with a fitting 360 whereby the fitting 360 inserts into the pump inlet 223. The fitting 360 includes a fitting base 361 and a fitting outlet 362. The fitting base 361 engages the bag and is permanently secured thereto using any suitable means such as a heat or sonic weld or suitable adhesive. The fitting outlet 362 snap fits into the pump inlet 223 or an adapter 246. In this preferred embodiment, the bag is constructed from flexible plastic material, but the pump 220 may be adapted to receive product from any type of source. In the preferred embodiment, the pump 220 and the package 210 may be considered sanitary and usable as delivered. In some cases the pump 220 may be preassembled to the package 210 for operational ease and sanitary considerations. An adapter 246 connectable to a product package 210 or the fitting 360 and the pump inlet 223 may also be utilized for delivery of product thereto in cases where the location of the pump 220 is not conducive to attaching to the fitting outlet 362 directly.

Figure 2A:
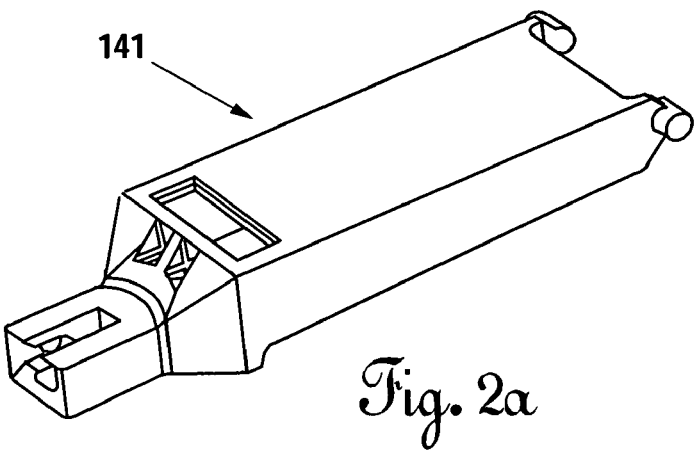
FIG. 2a is a detailed view of the pump driver according to the preferred embodiment.
Figure 2B:
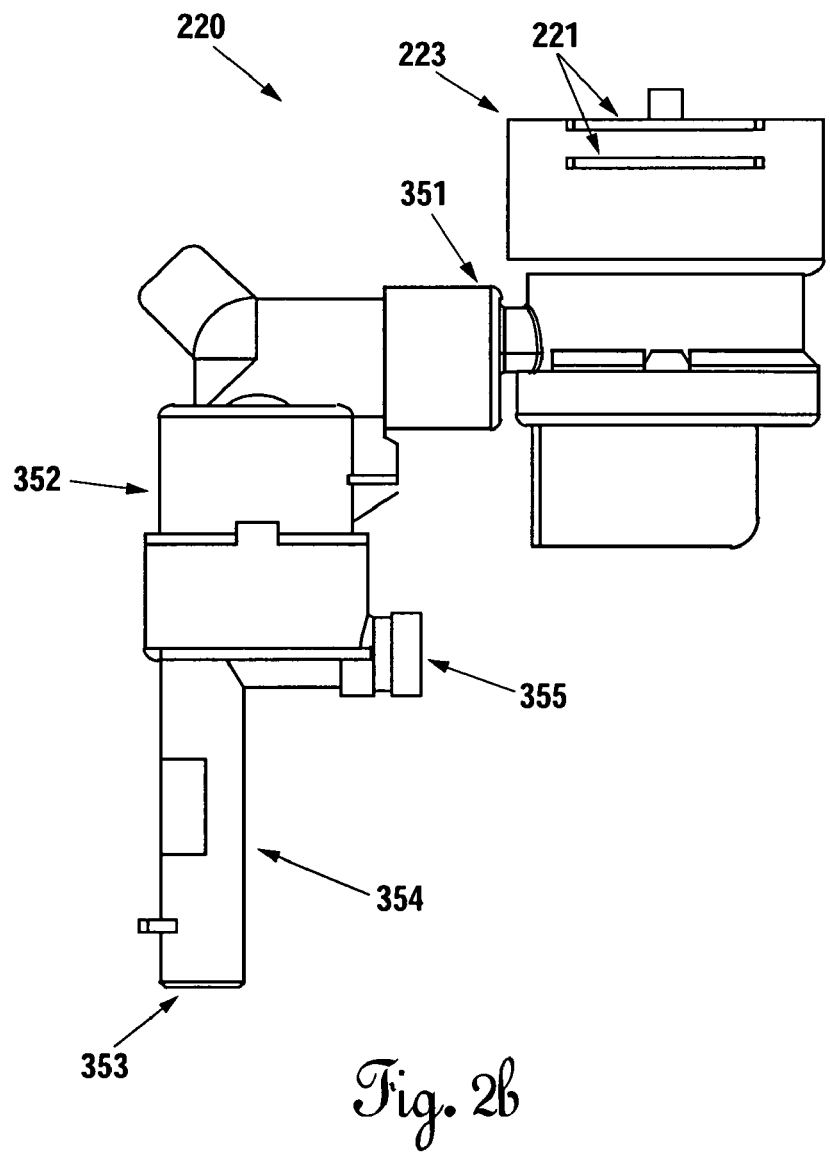
FIG. 2b is a side view of the pump and related features according to the preferred embodiment.
Figure 2C:
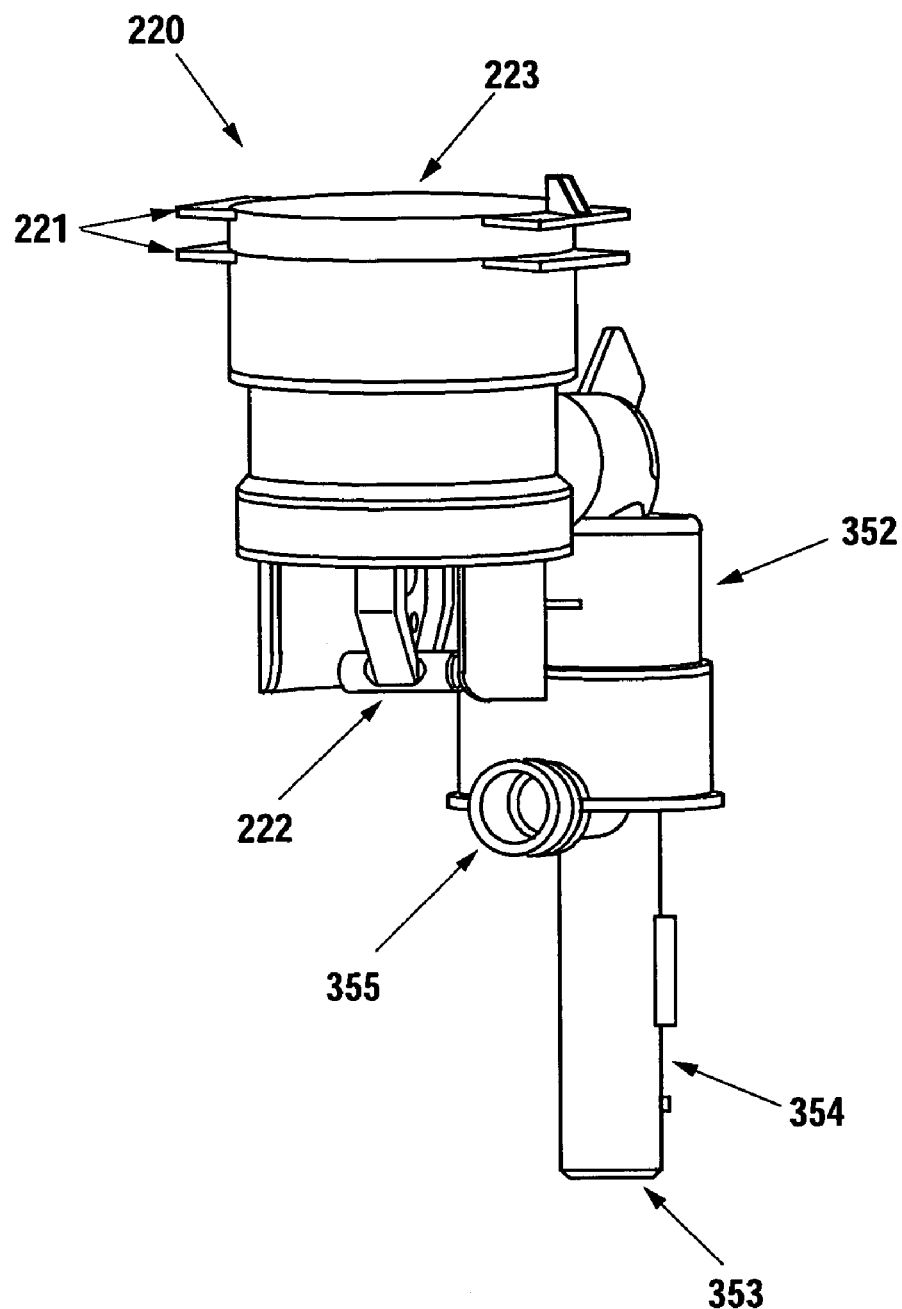
FIG. 2c is a perspective view of the pump and related features according to the preferred embodiment.
Figure 2D:
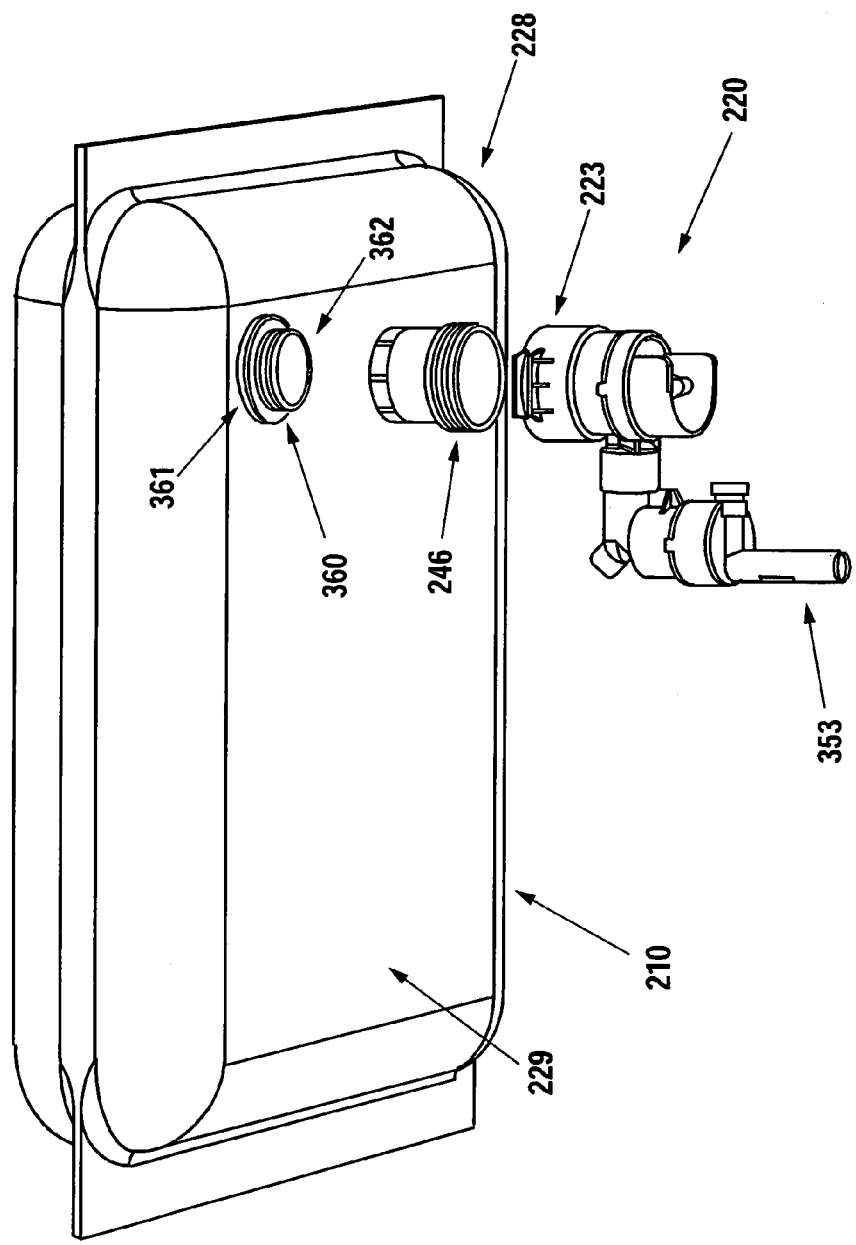
FIG. 2d illustrates the pump and product package according to the preferred embodiment.
Figure 2E:
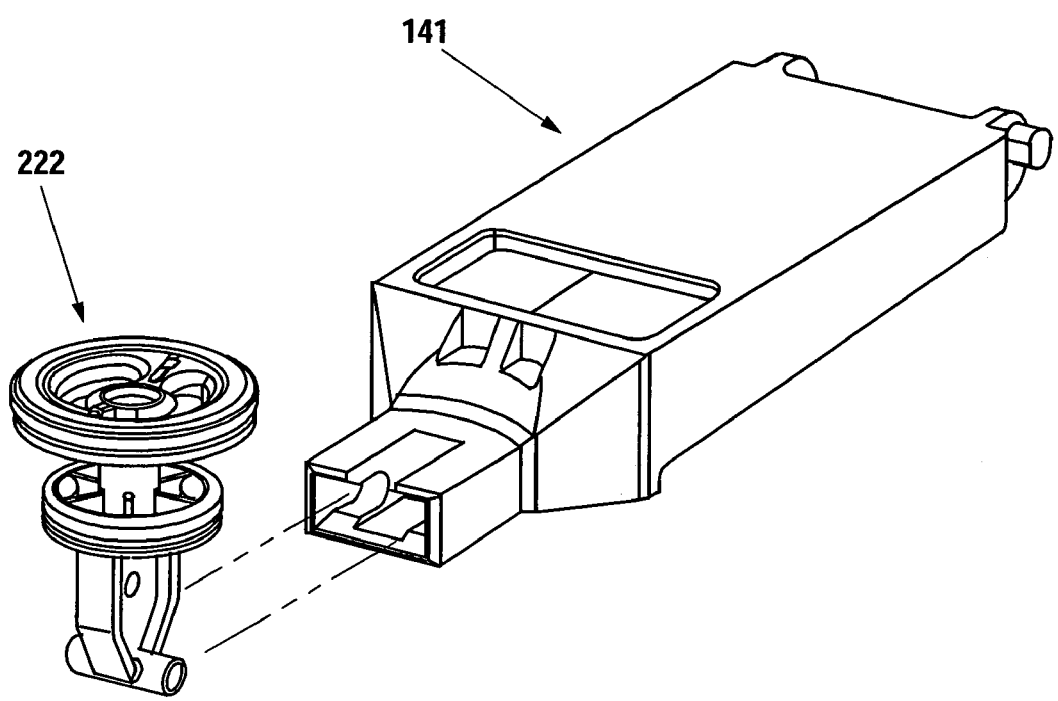
FIG. 2e provides a detailed view of the pump piston and the pump driver connection according to the preferred embodiment.

One of ordinary skill in the art will recognize that the form of product package described is well know in the art, and suitable for use with multiple product applications. One of ordinary skill in the art will further recognize that the range of product applications used with this type of product package includes products having varying viscosities and fluid properties. Accordingly, evacuation efficiencies for the varying products in a product package similar to the product package 210 may also vary, dependent upon the product package contents, orientation of the product package 210, and the like. Illustratively, a product package oriented on end, and containing a viscous product could develop an unrecoverable portion. In this specific example the product package 210 includes a recoverable portion 229, and an unrecoverable portion 228, as shown in FIG. 2d. High viscosity products do not flow great distances horizontally toward a product package opening, and therefore become trapped in a lowest corner opposite from the package opening. The remainder of the product package 210 is substantially recoverable.

Figure 3A:
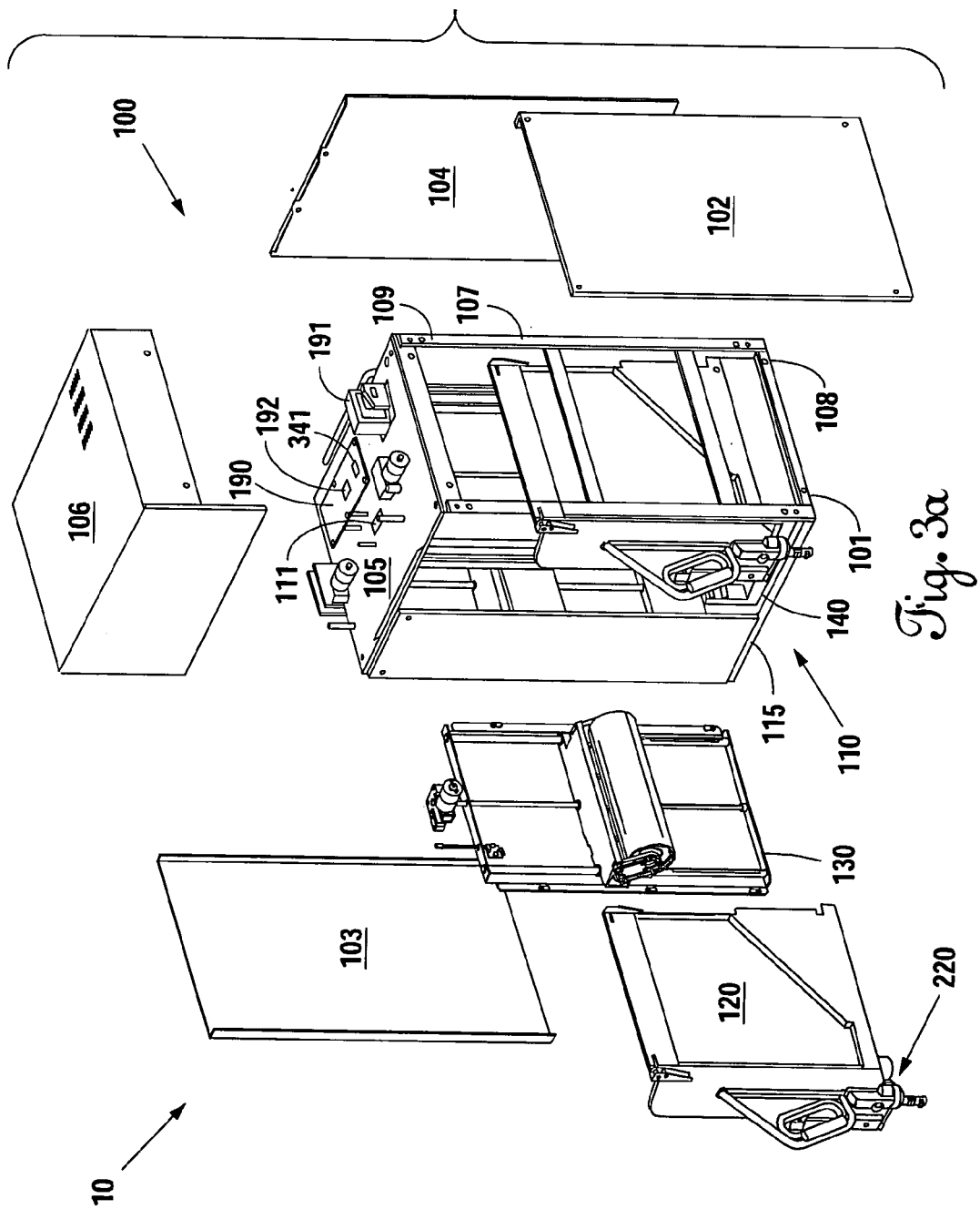
FIG. 3a is an exploded view illustrating the product dispenser according to the preferred embodiment.
Figure 3B:
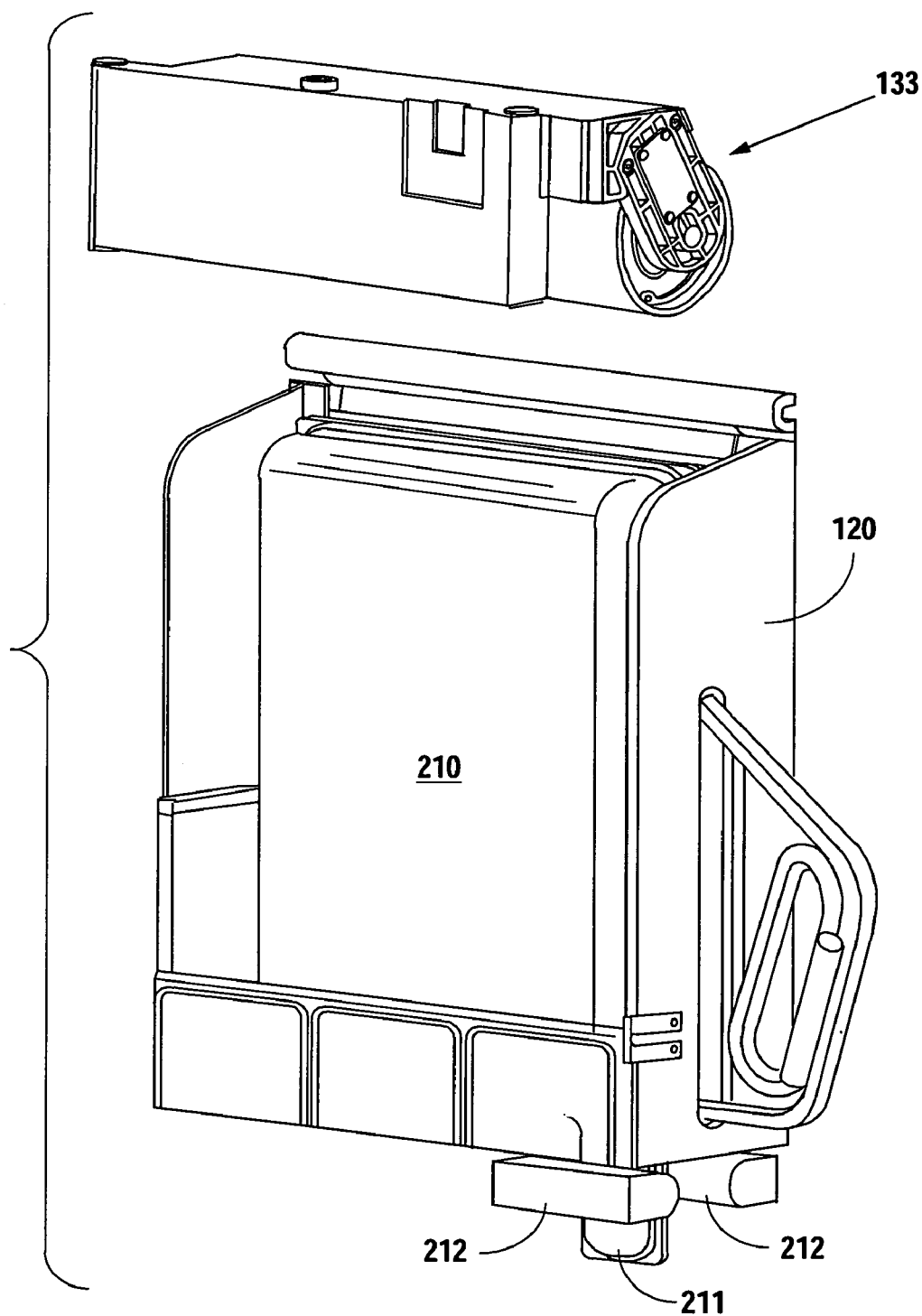
FIG. 3b is a perspective view illustrating an embodiment of the product dispenser that does not utilize a pump.
Figure 3C:
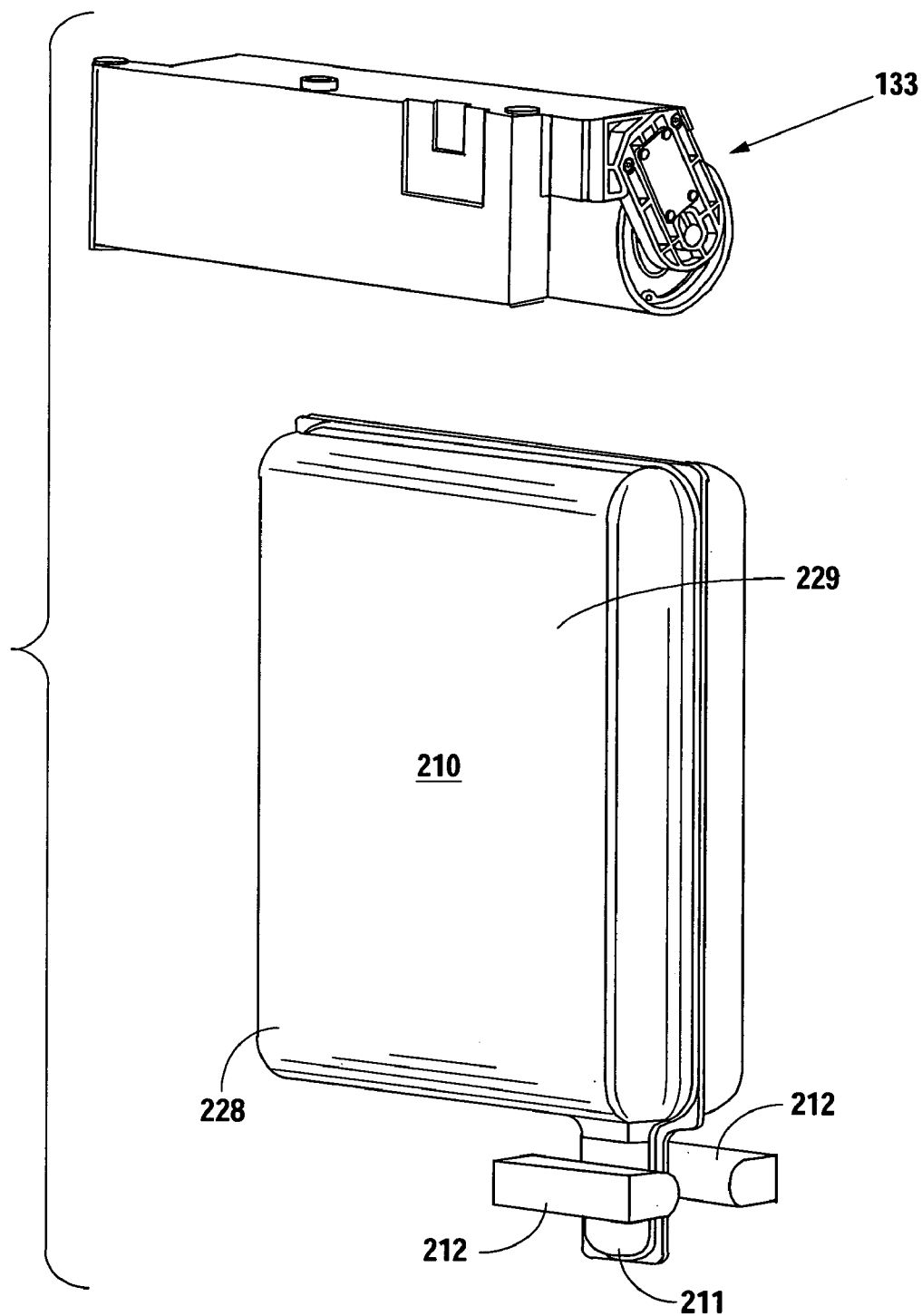
FIG. 3c is an isolated view of a non-pump embodiment showing a product package ready for engagement with the evacuation member.

In embodiments where a pump 220 is not used with the product package 210, the product dispenser 100 may dispense straight from a package or through an adapter or pinch valve 212 to hold a package opening shut during non-dispense periods as shown in FIG. 3b. In the embodiment shown in the isolated view of FIG. 3c, the dispenser 100 is shown to engage a spout portion 211 of a product package 210. The dispenser 10 may also engage an adapter or a fitting 360 located on a product package 210.

The housing 100 in this preferred embodiment is of sheet metal construction and includes a frame 115, a right side panel 102, a left side panel 103, a rear panel 104, and a top cover 106. The frame 115 includes a base 101, a mid plate 105 and a plurality of structural members 107. The structural members 107 have two opposing ends; a first end 108 is fastened to the base 101, and a second end 109 is fastened to the mid plate 105 at strategic intervals, thereby creating the rigid frame 115 that houses the dispensing stations 110. The side panels 102 and 103, the rear panel 104 and the top cover 106 are secured to the frame 115 using any suitable mechanical fastening means, such as screws or spot-welding.

Figure 4:
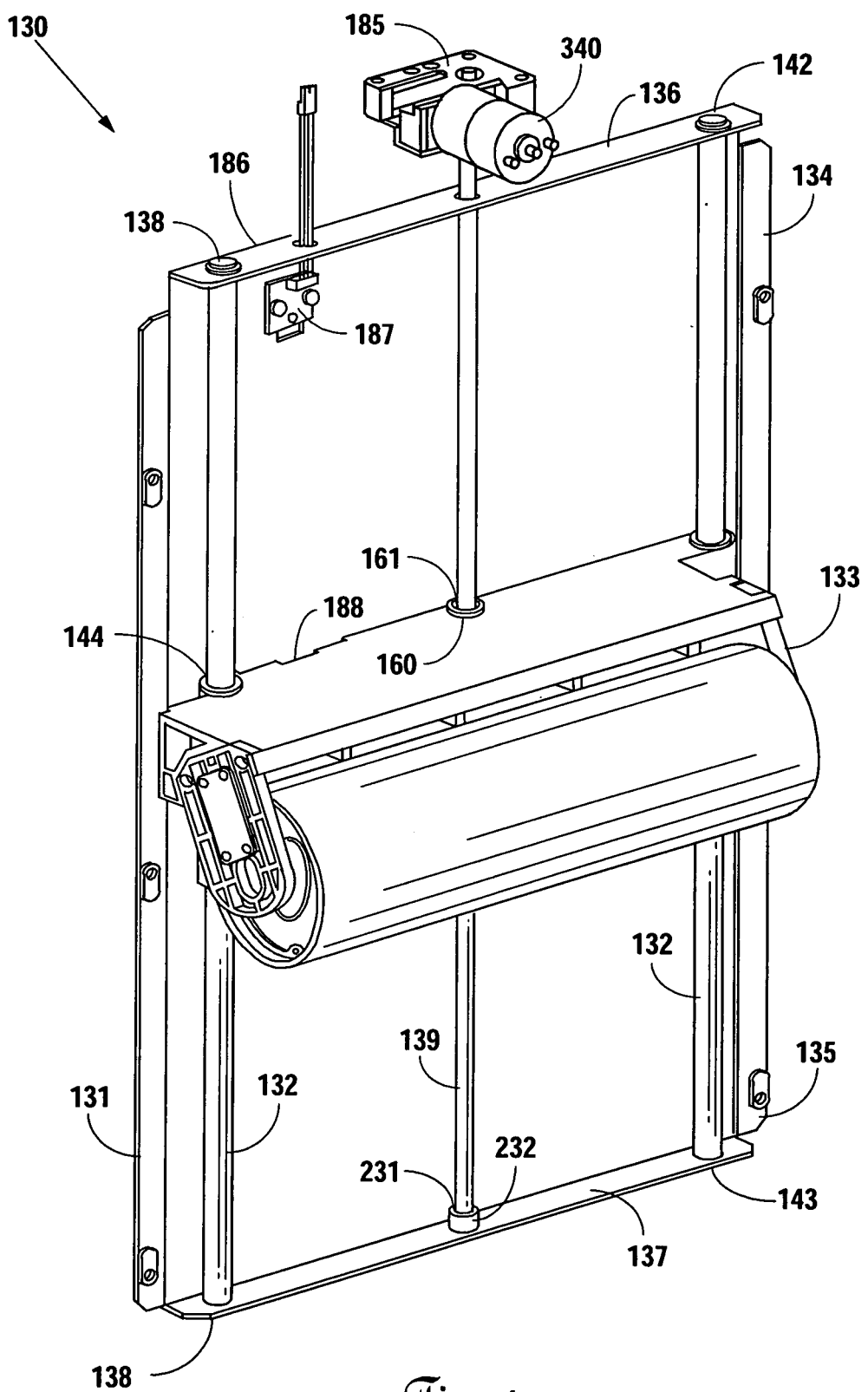
FIG. 4 is an isometric view of the backing plate assembly according to the preferred embodiment.

A dispensing station 110 includes a backing plate assembly 130, a pump driver unit 140 and a package carrier 120. The backing plate assembly 130 and the pump driver 140 are rigidly mounted to the housing 100. As shown in FIG. 4, each backing plate assembly 130 includes a guide plate 131, two guide bars 132, an evacuation member 133, a sensor 186, which in this preferred embodiment is a hall effect sensor, a threaded rod 139, and a driver 185. Each guide bar 132, having an upper end 142 and a lower end 143, passes through a hole 144 in the evacuation member 133 to limit motion of the evacuation member 133 to a vertical plane. The guide plate 131, having a top end 134 and a bottom end 135, includes a top flange 136 at the top end 134 and a bottom flange 137 at the bottom end 135 extending toward the evacuation member 133.

The top flange 136 and the bottom flange 137 each have three apertures, an outer aperture 138 at each end of the respective flanges 136 and 137 and one center aperture 231 located in the center of the flanges 136 and 137. The outer apertures 138 are for mounting the upper and lower ends 142 and 143 of the guide bars 132, thereby capturing the evacuation member 133 between the flanges 136 and 137. In this preferred embodiment, the guide bars 132 are mounted using mechanical fasteners, however, any suitable mechanical fastening means may be used. The guide plate 131 further has a cutout 187 below the top flange 136 to locate the sensor 186. The center apertures 231 receive the threaded rod 139.

Figure 5A:
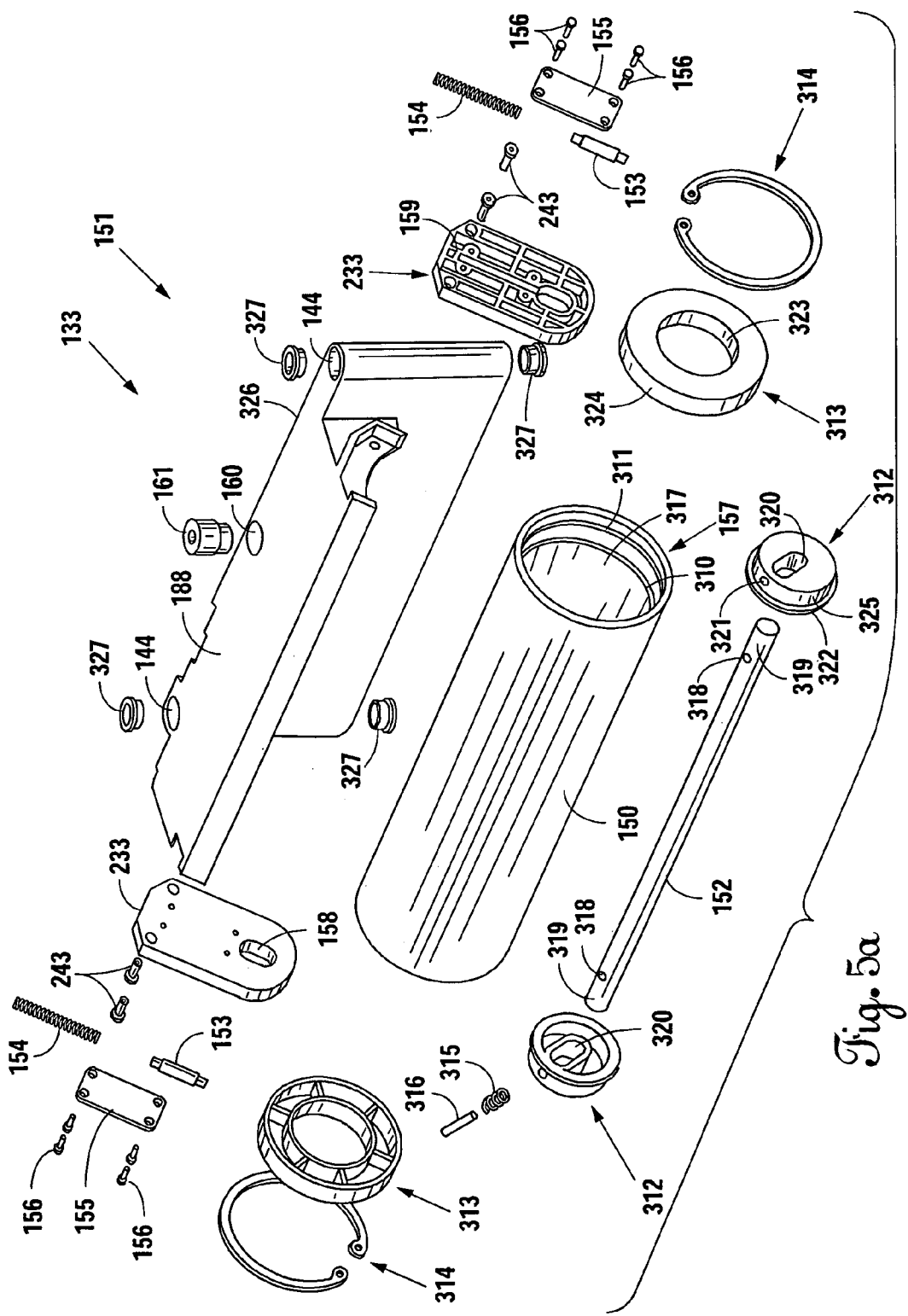
FIG. 5a is an exploded view of the evacuation member according to the preferred embodiment.
Figure 5B:
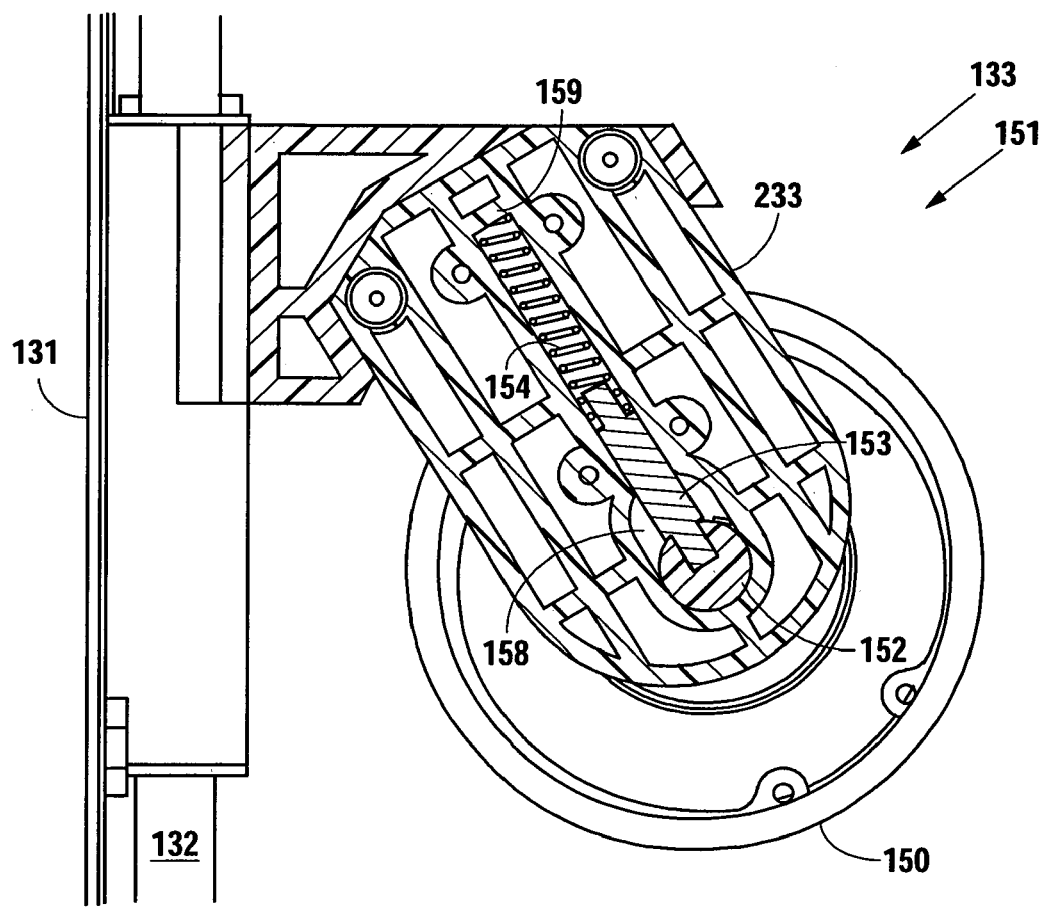
FIG. 5b is a section view of the evacuation member taken along the axis of the flange spring according to the preferred embodiment.
Figure 5C:
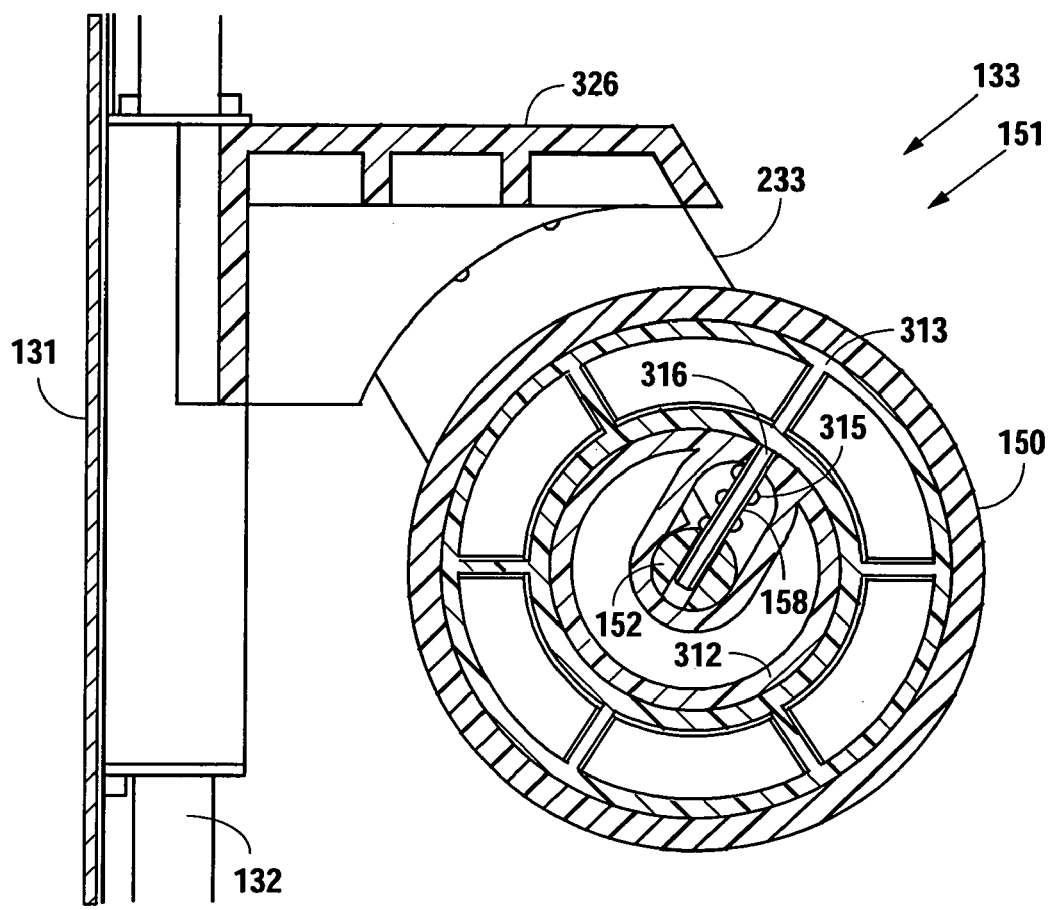
FIG. 5c is a section view of the evacuation member taken along the axis of the hub spring according to the preferred embodiment.

As shown in FIGS. 4-5a, a drive hole 160 in the evacuation member 133 houses a drive nut 161 having prescribed internal thread features that are suitable for mating with those on the threaded rod 139. The threaded rod 139 passes through the internal threads of the drive nut 161, whereby rotation of the threaded rod 139 forces the evacuation member 133 to move either upward or downward along the guide bars 132. The threaded rod 139 passes through the center apertures 231 of both the top flange 136 and the bottom flange 137. Once outside of the guide plate 131, the threaded rod 139 passes through a hole 111 in the mid plate 105 to enter the housing 100. The center aperture 231 in the bottom flange 137 further includes a bearing 232 to guide the threaded rod 139.

The threaded rod 139 is connectable to the driver 185, whereby activating the driver 185 results in rotation of the threaded rod 139. In this preferred embodiment, the driver 185 is a reversible motor, however, one of ordinary skill in the art will recognize that any suitable driving device may be employed to rotate the threaded rod 139. The driver 185 is mounted outside of the dispensing station 110 on top of the mid plate 105. The driver 185 is equipped with an encoder 340 to provide motor revolution data used in deriving locations of attached components, such as the evacuation member 133.

The evacuation member 133 includes a roller 150, a roller shaft 152 and a roller frame assembly 151. The roller 150, in this preferred embodiment, is of a cylindrical shape having two identical opposing ends 157 perpendicular to the cylindrical axis. Each end 157 of the roller 150 includes a recessed pocket 310 and a retaining ring groove 311. The recessed pocket 310 is suitable for connection with a bearing 313. A shaft hole 317 passes through the center of each of the ends 157 for receiving the roller shaft 152. The roller shaft 152 is of metal construction having two symmetrical ends; each shaft end having two holes, a hub connection hole 318 and a roller frame connection hole 319. The hub connection hole 318 is used to constrain a hub 312 to the roller shaft 152 with a pin 316 and a hub spring 315. The hub 312 is a circular injection molded piece having a hub slot 320 for receiving the roller shaft 152, a hole 321 passing from an outer face 325 through to the hub slot 320, and a flange 322 to support the bearing 313.

When assembled, the hub 312 is placed over the roller shaft 152 wherein the flange 322 is furthest from the end of the roller shaft 152. The hole 321 is aligned with the hub connection hole 318 on the roller shaft 152, and the hub spring 315 is placed inside of the hub slot 320. The hub pin 316 is then pressed into the hub connection hole 318. The hub pin 316 may be recessed below the outer face 325 of the hub 312. In this arrangement, the roller shaft 152 cannot rotate relative to the hub 312, but the roller shaft 152 does have movement along the hub slot 320 if the hub spring 315 preload force is overcome.

A circular bearing 313 having an inner periphery 323 and an outer periphery 324 is connectable to the hub 312, wherein the inner periphery 323 mounts onto the outer face 325 of the hub 312. The outer periphery 324 of the bearing 313 fits into the recessed pocket 310 of the roller 150, wherein the roller 150 and the bearing 313 can rotate about the hub 312 and roller shaft 152. A retaining clip 314 is housed in the retaining clip groove 311 adjacent to the bearing 313 to capture the bearing 313.

The roller frame assembly 151 includes a frame support 326 and two flanges 233. The flanges 233 are secured to the frame support 326 by two screws 243. The flanges 233 are connectable to the roller shaft 152 via flange slot 158, therein capturing the roller 150. The frame support 326 includes a pair of guide holes 144 for receiving the guide bars 132. Each end of the guide holes 144 is sleeved with a guide bar bearing 327 for smooth translation. Each roller frame flange 233 has a flange slot 158 for receiving the roller shaft 152. The roller shaft 152 is able to move along the flange slot 158.

As shown in the section view of FIG. 5b, the roller shaft 152 is connectable to a pressure rod 153 that is in line with a spring 154 to apply pressure to the roller shaft 152. The spring 154 and the pressure rod 153 reside in a pocket 159 extending from the flange slot 158 along the slot 158 axis. A cover plate 155 that is restrained by a plurality of screws 156 covers the pocket 159. Once installed, the spring 154 and the pressure rod 153 apply continuous pressure to the roller shaft 152 and ultimately, the roller 150. In this arrangement, the roller shaft 152 does not rotate, but is able to adjust for minor irregularities in the roller's path by compressing springs 154 and 315. The roller frame 151 further includes a magnet 188 disposed therein, to activate and deactivate the sensor 186 field as the evacuation member 133 moves to and from a home position.

While the evacuation member 133 in this preferred embodiment has been shown with a roller 150, it should be clear to one of ordinary skill in the art that the roller 150 may be replaced by a wiper, squeegee or the like to similarly evacuate the product package 210.

Figure 6:
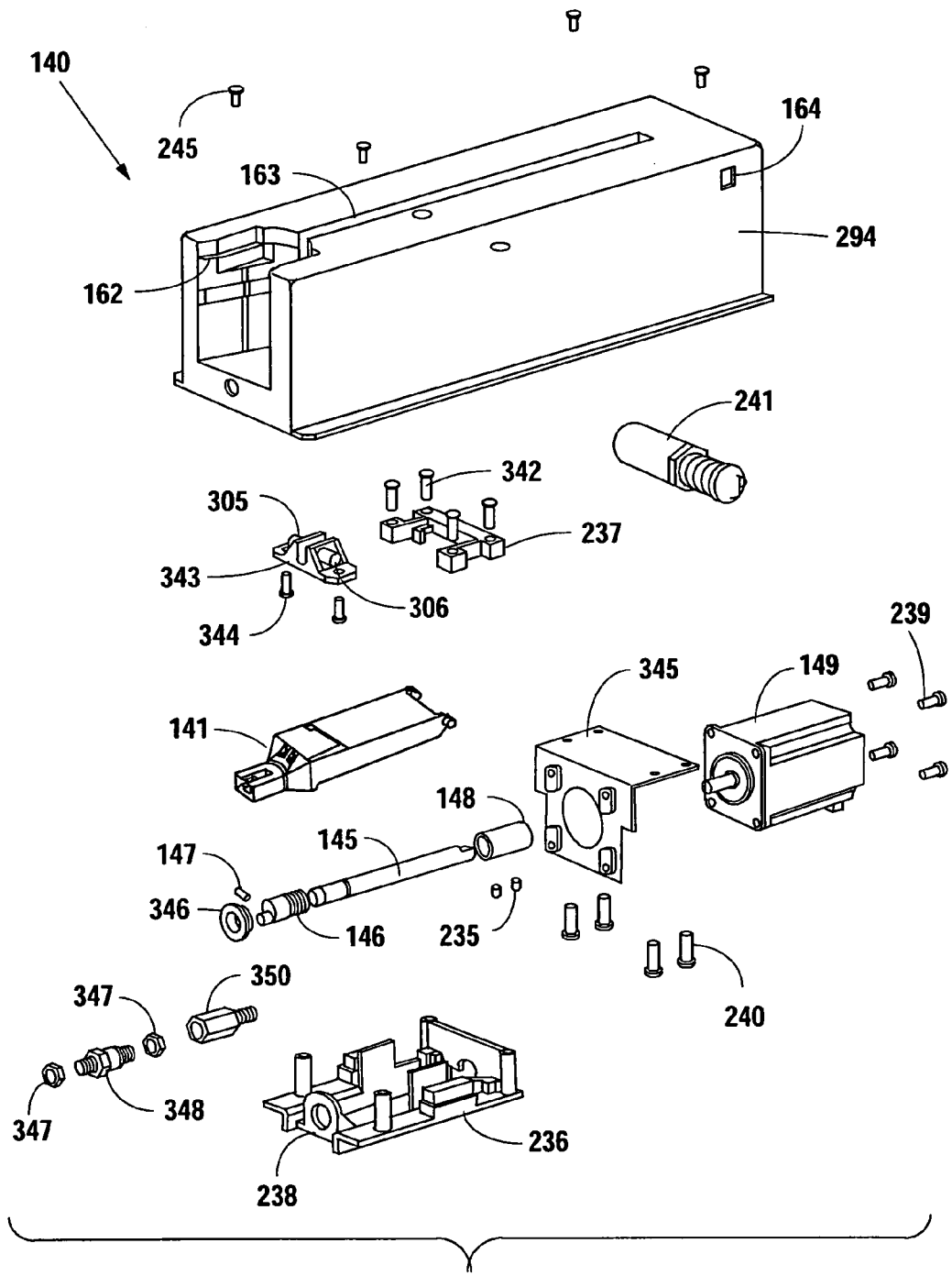
FIG. 6 is an exploded view of the driver unit according to the preferred embodiment.

The pump driver unit 140 is the assembly that restrains the product pump 220 and drives the piston 222 in an up and down motion. The pump driver unit 140 is mounted at the lower end of the dispensing station 110, thereby supporting the package carrier 120 upon installation. The pump driver unit 140 is similar in design and construction to the pump driver disclosed in U.S. Pat. No. 6,568,565 B1, which issued on May 27, 2003. FIG. 6 provides an exploded view of the pump driver unit 140. The pump driver unit 140, in this preferred embodiment, includes the pump driver 141 that is connectable to the product pump 220 for providing a requisite motion to drive the product pump 220. A motor 149 provides rotational motion to drive the pump 220 through a connectable coupling 148 and a driveshaft 145. An offset cam 146 held in place by a pin 147 converts the rotational motion into vertical motion. The coupling 148 is secured with a pair of setscrews 235. The pump driver 141 is connectable to the offset cam 146 and resides on a drive base 236. A drive fork retainer 237 and a set of screws 342 restrain the pump driver 141. The drive base 236 includes an aperture 238 for receiving a guide bushing 346. The motor 149 is connectable to a motor bracket 345 and restrained by a set of screws 239. The motor bracket 345 is secured to a drive unit cover 244 by a set of screws 240. The driver unit cover 244 encapsulates the assembly and is secured to the housing base 101 by a plurality of screws 245.

The driver unit 140 further includes an optical sensor bracket 343 that contains an emitter 305 and a detector 306 that produce an optical beam in a guide slot 163 of the driver unit cover 244. The driver unit cover 244 further includes a pair of pump engagement rails 162 and the guide slot 163 for receiving a first alignment tab 225 and a second alignment tab 370 from the package carrier 120, thereby simplifying the package carrier 120 loading process. The driver unit 140 further includes a package lock solenoid 241 and a solenoid access hole 164 to provide the package lock solenoid 241 with a passage to engage the package carrier 120 in a solenoid engagement window 242. The driver unit 140 may further include a diluent fitting 348 and a diluent fitting adapter 350 for applications wherein diluent is required to dilute a concentrate. The diluent fitting 348 is connectable to the diluent inlet port 355 of the pump 220. The seal is maintained through the use of a pair of o-rings 347 on each end of the diluent fitting 348.

Figure 1B:
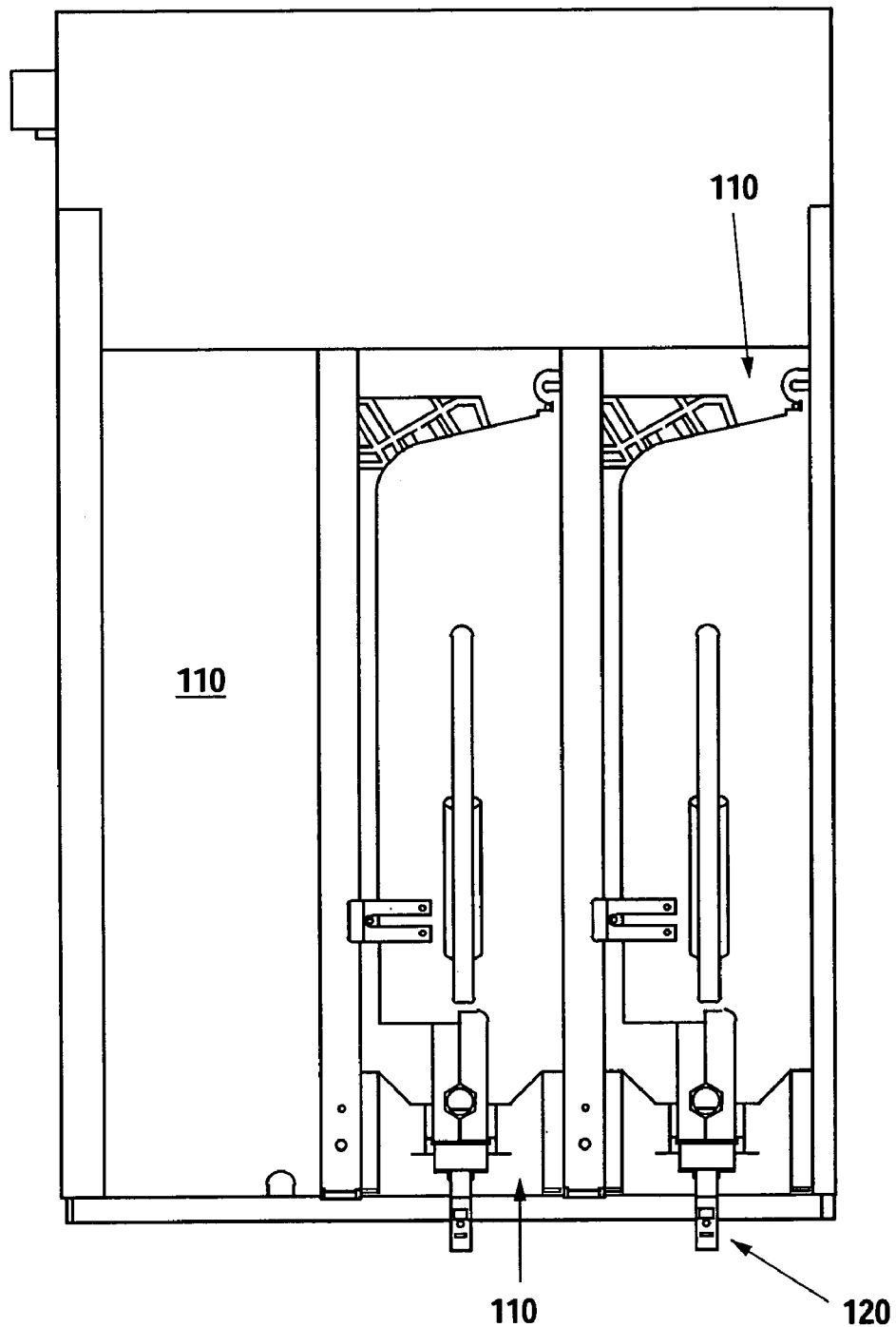
FIG. 1b is a front view illustrating the product dispenser according to the preferred embodiment.

The package carrier 120 is designed to house a product package 210 connected to a pump 220. The package carrier 120 is removable for package 210 loading and subsequent product and package 210 replenishing. As shown in FIGS. 1-3, the package carrier 120 slides into a dispensing station 110, whereby the pump 220 engages with the pump driver 141 of the pump driver unit 140, and the diluent inlet 355 of the pump 220 connects to the diluent fitting 348 of the product dispenser 10. The package carrier 120 is held in the dispensing station 110 by the package lock solenoid 241 installed in the driver unit cover 244. Alignment of the package carrier 120 is accomplished by inserting the first alignment tab 225 into the guide slot 163, and pushing the package carrier 120 towards the rear of the product dispenser 10 until the second alignment tab 370 is located in the guide slot 163 and the pump 220 is engaged with the driver unit cover 244.

Figure 7A:
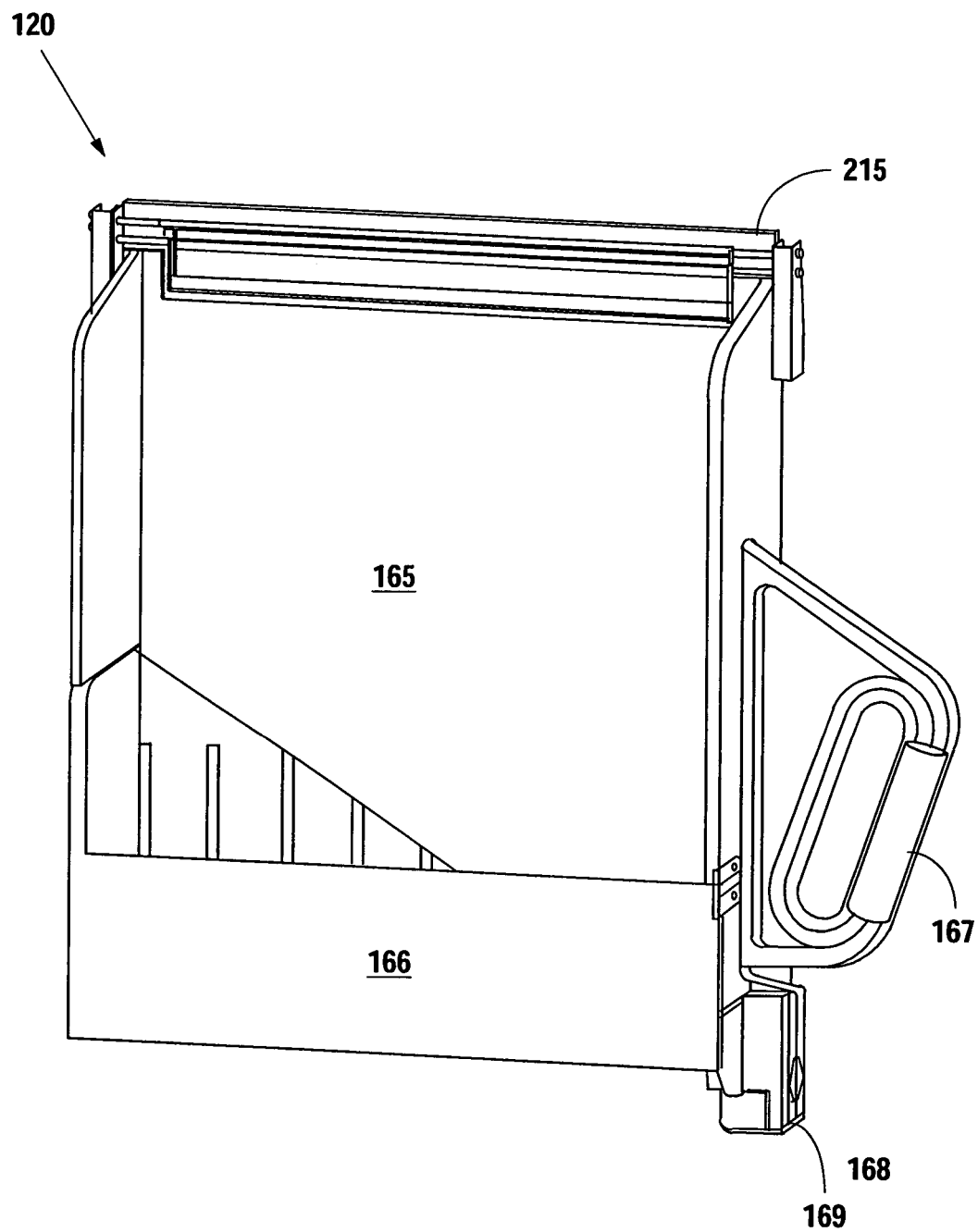
FIG. 7a is a perspective view illustrating a package carrier according to the preferred embodiment.
Figure 7B:
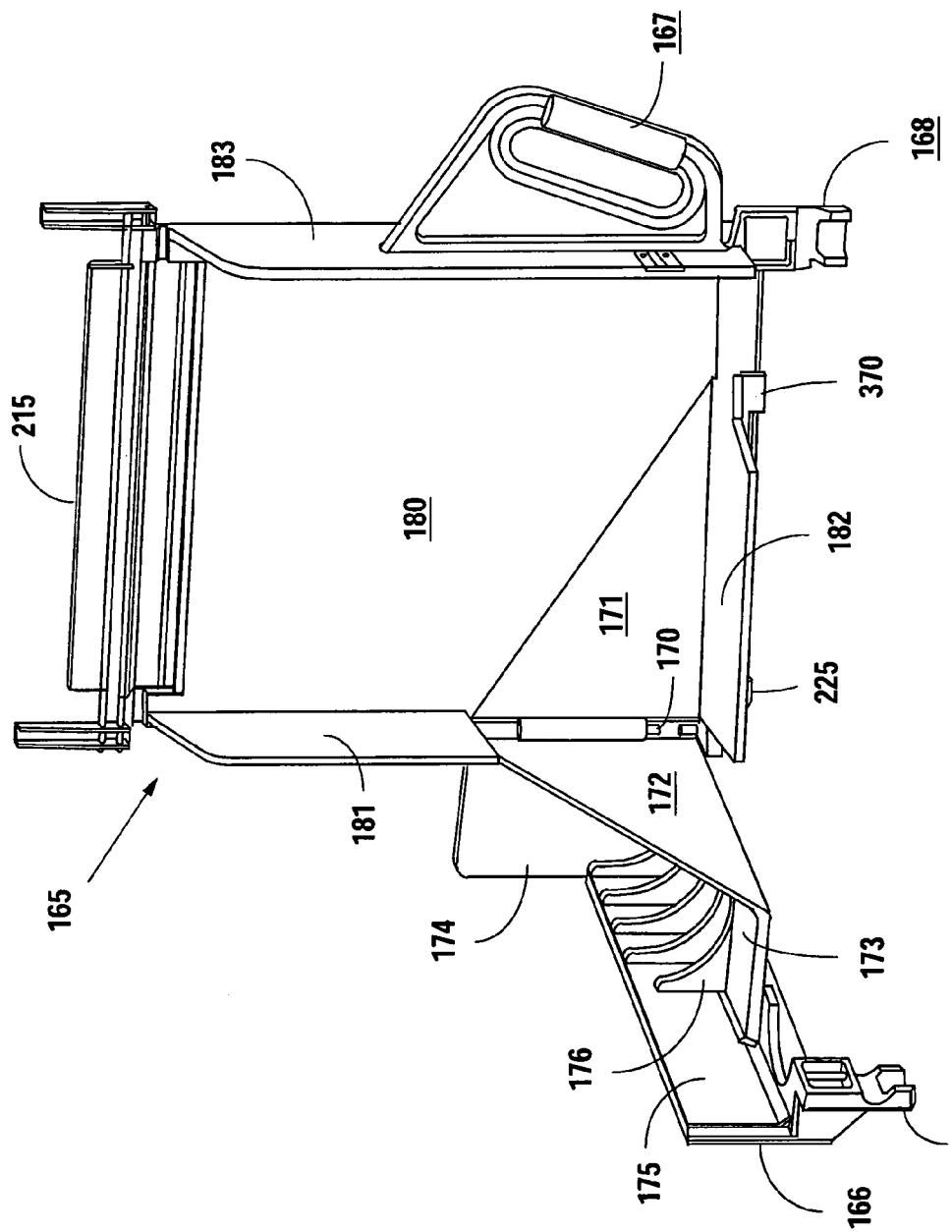
FIG. 7b is a perspective view of a package carrier in the open position according to the preferred embodiment.

As shown in FIGS. 7a-7b, a package carrier 120 includes a package support 165, a restraining support 166, a lockdown clamp 215, and a hinge 170. The package support 165 includes a side wall 180, a bottom wall 182 connectable to the side wall 180, a front wall 183 connectable to the side wall 180 and a rear flap 181 connectable to the side wall 180, thereby creating a partially enclosed cavity to accept a product package 210. The side wall 180 includes a recessed pinch off area 171. The package support 165 further comprises a handle 167 to aid in package carrier 120 transport and loading and a pump retainer 168 for locating the pump 220. The hinge 170 connects the package support 165 and the restraining support 166.

The restraining support 166 includes a bottom wall 173, a back wall 174, a pinch off face 172, and a front wall 175 to form a cavity for receiving an evacuation member 133 in a down position. The restraining support 166 further includes a bearing wall 230 that is coplanar to the side wall 180 of the package support 165 in the closed position, thereby allowing the roller 150 to pass over the side wall 180 and the bearing wall 230 unobstructed. The restraining support 166 further includes ribs 176 to increase the stiffness of the part, and a pump retainer 169 for locating the pump 220.

Figure 7C:
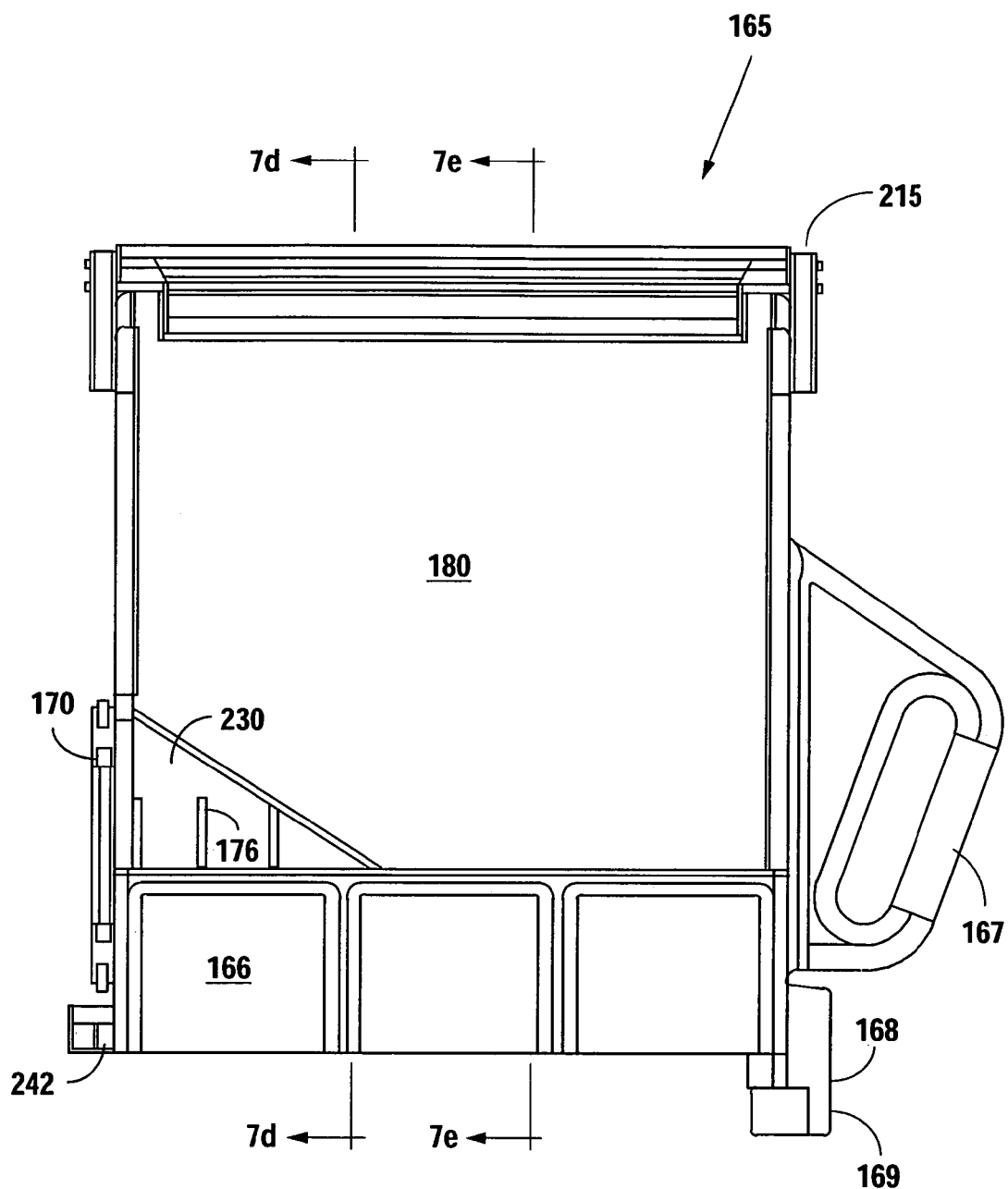
FIG. 7c is a side view of a package carrier according to the preferred embodiment.

Upon closure, the two pump retainers 168 and 169 come together to capture the pump 220, thereby minimizing extraneous motion during a package carrier 120 loading process. In the closed position the pinch off face 172 of the restraining support 166 aligns and faces off on the recessed pinch off area 171 of the package support 165, therein displacing product and sealing off the unrecoverable portion 228 of the package 210 that is difficult to evacuate. In this specific example, the unrecoverable portion 228 is a lowest corner that lies between the pinch off face 172 and the recessed pinch off area 171, when the product package 210 is in the installed position. Therein, the closed carrier 120 and the package 210 simulate a package 210 having an angled seam. The simulated angled seam forces product to flow toward the pump 220 when driven by the roller 150, thereby increasing package 210 evacuation. FIG. 7c shows a package carrier 120 in the closed position. Section A-A, shown in FIG. 7d, reveals that the package 210 profile is pinched closed at the lower end by the recessed pinch off area 171 and the mating pinch off face 172. Section B-B, shown in FIG. 7e, located in front of the pinched off area, shows an unrestricted package 210 profile.

Figures 7D, 7E, 7F:
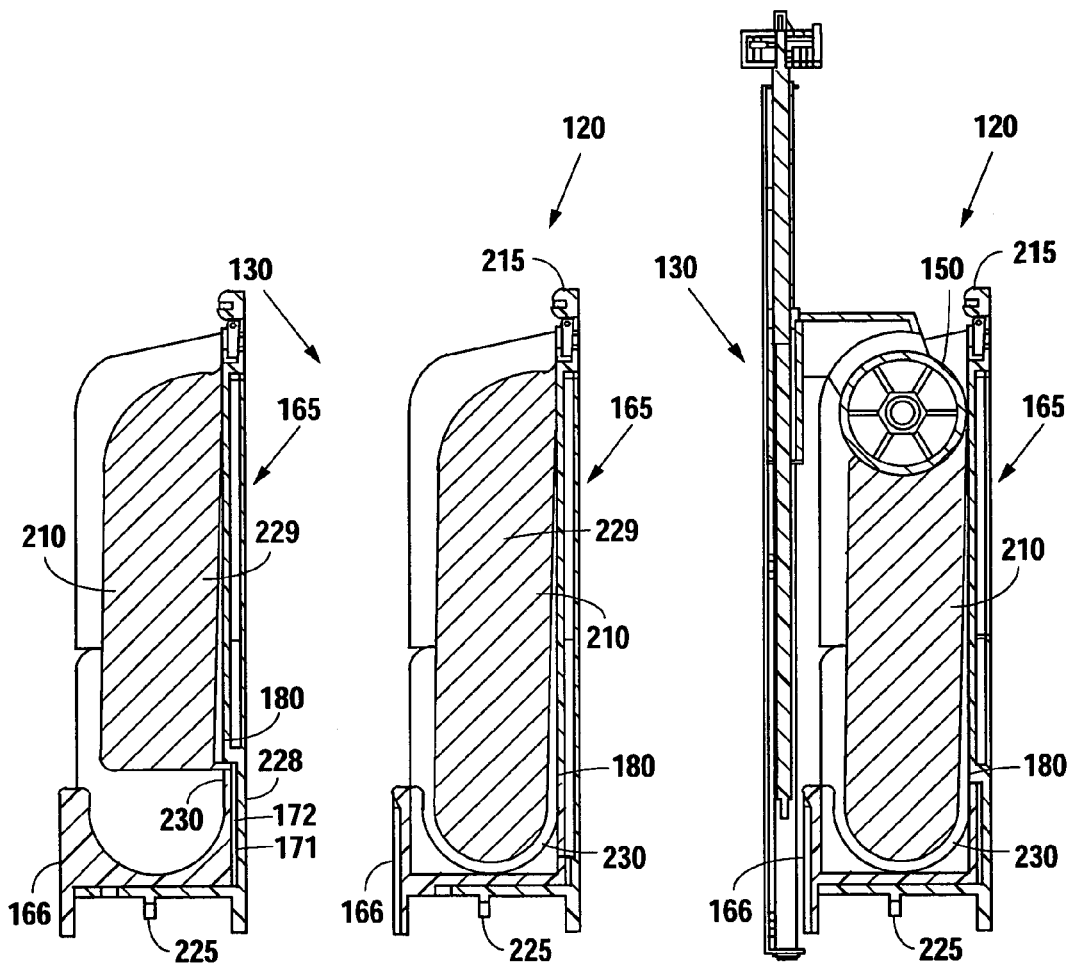
FIG. 7d is a section view of a package carrier showing a restricted package profile according to the preferred embodiment.
FIG. 7e is a section view of a package carrier showing an unrestricted package profile according to the preferred embodiment.
FIG. 7f is a cross section of a dispensing station with a package carrier containing a package.

The spring loaded roller 150, in conjunction with the package carrier 120, moves the product from the upper area of the product package 210 to the area above the pump 220 when a current is applied to the driver 185. FIG. 7f provides a cross section of a dispensing station 110 with a package carrier 120 containing a package 210. As the evacuation member 133 moves down the guide bars 132, the contents of the package 210 are forced downward. As the roller 150 moves over the recessed pinch off area 171, the package 210 contents then acquire a horizontal force component and are forced to move along the simulated slope at the top edge of the recessed pinch off area 171 toward the pump 220 inlet. Package 210 evacuation with this system typically provides an efficiency of greater than ninety six percent.

While this preferred embodiment has been shown with a pump driver unit 140, it should be clear to one of ordinary skill in the art the that pump driver unit 140 may not be required in embodiments that do not utilize product pumps 220. Furthermore, the package carrier 120 design may be dictated by product package 210 designs. Packages 210 for aseptic or non-aseptic processes usually differ due to the different process steps. Design of a package carrier 120 may be dependent on whether a pump 220 is used in the dispensing process. In a no pump 220 embodiment, there may be deviations in the package carrier 120 design based on the product package design. Changes may include fitment type and location, as well as packages not requiring fitments or pumps.

The product dispenser 10 further includes a transformer 191 and a printed circuit board 190 containing a microcontroller 192 mounted on the mid plate 105 under the top cover 106. The microcontroller 192 is suitable for receiving and/or delivering signals from the components disclosed in this description, including the hall effect sensors 186, the package lock solenoids 241, and the driver 185, as well as external devices that may be connectable.

As shown in FIG. 8, the product dispenser 10 is connectable to a primary device, such as a sauce spreading device, whereby the product dispenser 10 may be situated on top of or next to the primary device, to take and receive signals therefrom, as well as to deliver product to the primary device. In this case, the microcontroller of the primary device controls operations based on dispensing valve actuation and communicates dispense signals to the microcontroller 192 of the product dispenser 10, so that the product dispenser 10 is able to conduct evacuation processes based on all dispensing operations, as well as enable the product dispenser 10 to transmit feedback data to the primary device.

Although the preferred embodiment discloses a dispenser that is dependent upon another device for information and signals, the product dispenser 10 may be outfitted as a self sustaining unit for delivery of product in a variety of forms, including concentrates and single strength applications, as well as additives. In a self-sustaining unit configuration, the method steps and actions performed by the microcontroller of the primary device are executed by the microcontroller 192.

When a package carrier 120 is not installed, the product dispenser 10 is in a wait mode. The evacuation member 133 is in a home position. The home position is the uppermost position of the evacuation member 133 travel. The home position is registered by the microcontroller 192 through the use of the hall effect sensor 186 on the guide plate 131 and the magnet 188 housed in the evacuation member 133. In the home position, the magnet 188 triggers the hall effect sensor 186. As the evacuation member 133 moves downward, the sensor 186 field is broken and the microcontroller 192 registers the evacuation member 133 as not in the home position.

In use, an operator must first load a package 210 into the carrier 120. Loading of a package 210 is illustrated in the method flowchart of FIG. 9. The process begins with step 20, opening a carrier. In step 25, the operator places a package 210 already attached to a pump 220 into the package carrier 120 by inserting a top end of the package 210 into the lockdown clamp 215. The operator then lifts and lowers the unclamped end of the package 210, thereby moving the product out of the lower end of the package 210 as shown in step 30. In step 35, the operator locates the pump 220 in the pump locating feature 168 on the package support 165 side. In the final step, step 40, the operator closes the package restraint 166, thereby capturing the unrecoverable portion 228 of the package 210 in the recessed pinch off area 171. Upon closing the package restraint 166, product is forced from between the recessed pinch off area 171 and the pinch off face 172 as the two faces come together, thereby moving the product from the unrecoverable portion 228 to the recoverable portion 229 of the product package 210. The package carrier 120 is then ready for insertion into the dispensing station 110 of the product dispenser 10.

Figure 10A:
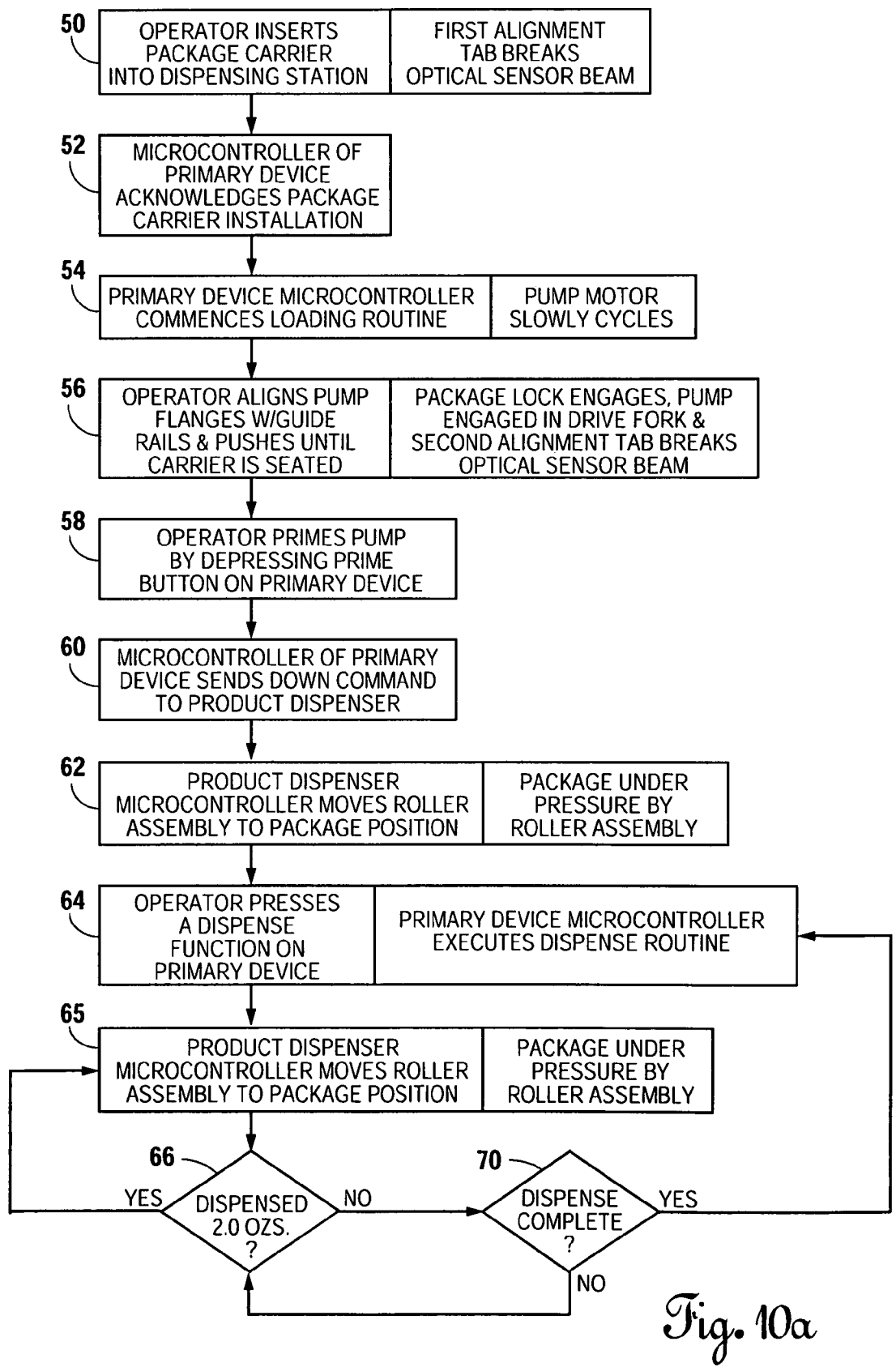
FIG. 10a is a method flowchart of the dispensing operations of the product dispenser.

Loading of a package carrier 120 begins with the operator taking the package carrier 120 by the handle 167, and inserting the hinged end into the dispensing station 110 as shown in step 50 of FIG. 10a. At this point, the first alignment tab 225 on the carrier is in the guide slot 163, thereby breaking the optical sensor beam between the emitter 305 and the detector 306. Upon the breaking of the optical sensor beam, the microcontroller of the primary device acknowledges the commencement of the package carrier installation as shown in step 52. In step 54, the microcontroller of the primary device commences a loading routine, wherein the pump motor 149 cycles for a predetermined interval, thereby moving the pump driver 141 up and down to receive the pump 220.

As the operator continues to push the carrier 120 into the dispensing station 110 along the guide slot 163, step 56, the operator must ensure that the pump flanges 221 align with the guide rails 162 of the driver unit cover 244. The operator continues to push until the second alignment tab 370 breaks the sensor beam and the package carrier 120 is locked in place by the locking solenoid 241. When the package carrier 120 is properly installed in the dispensing station 110, the pump 220 engages the pump driver 141 and the second alignment tab 370 breaks the optical sensor beam, thereby informing the microcontroller of the primary device that a package carrier 120 is installed. The product dispenser 10 now waits for information from the microcontroller of the primary device.

Once the carrier 120 is locked in the product dispenser 10, the operator primes the pump 220 by pressing a prime button on the primary device as shown in step 58. Priming the pump 220 allows the operator to verify that the water and concentrate streams are being delivered in the correct proportions. The activation of the prime button triggers the microcontroller of the primary device to inform the microcontroller 192 of the carrier 120 installation. Upon a prime button activation, step 58, the microcontroller of the primary device sends a down command to the product dispenser 10, step 60. The product dispenser 10 then provides current to the driver 185 to move the evacuation member 133 to a package 210 position, wherein pressure is applied to the package 210 by the evacuation member 133, step 62. The product dispenser 10 and the primary device are now ready to dispense product.

The operator is now able to press a dispense function button on the primary device, wherein the primary device microcontroller will execute the dispense routine, step 64.

The microcontroller of the primary device issues a down command every time a dispense function is pressed, and after a prescribed amount of product has been dispensed during a dispense routine. The microcontroller 192 then commences a down routine, therein ensuring that the product package 210 is under pressure, step 65. The microcontroller 192 then moves to step 66, where it checks the amount of sauce dispensed. If a predetermined amount of sauce has not been dispensed, two ounces in this preferred embodiment, the microcontroller moves to step 70, where it determines if the dispense routine has been completed.

If the dispense routine has been completed, the process returns to step 64, wherein the primary device waits for another dispense function to be selected. If, in step 70, the dispense routine has not been completed, the microcontroller then returns to step 66, where it evaluates the need to move the evacuation member 133 to the package 210. If the amount of sauce dispensed in step 66 is over the threshold, the process moves to step 65, where it continues to apply pressure to the package 210. This process remains in the loops until a package 210 is emptied or the product dispenser 10 is shut down.

The current applied to the driver 185 is monitored to limit the maximum squeeze force applied to the product package 210. The control scheme for monitoring the current applied to the driver 185 includes a software routine in conjunction with a current sensor. In this preferred embodiment, the current sensor is a shunt resistor 341 on the printed circuit board 190. The voltage across the shunt resistor 341 is sampled by the microcontroller 192 to obtain information to derive the current values seen by the driver 185. A maximum voltage level, point seven volts in this preferred embodiment, ensures that the driver 185 working range does not damage the product package 210.

Figure 10B:
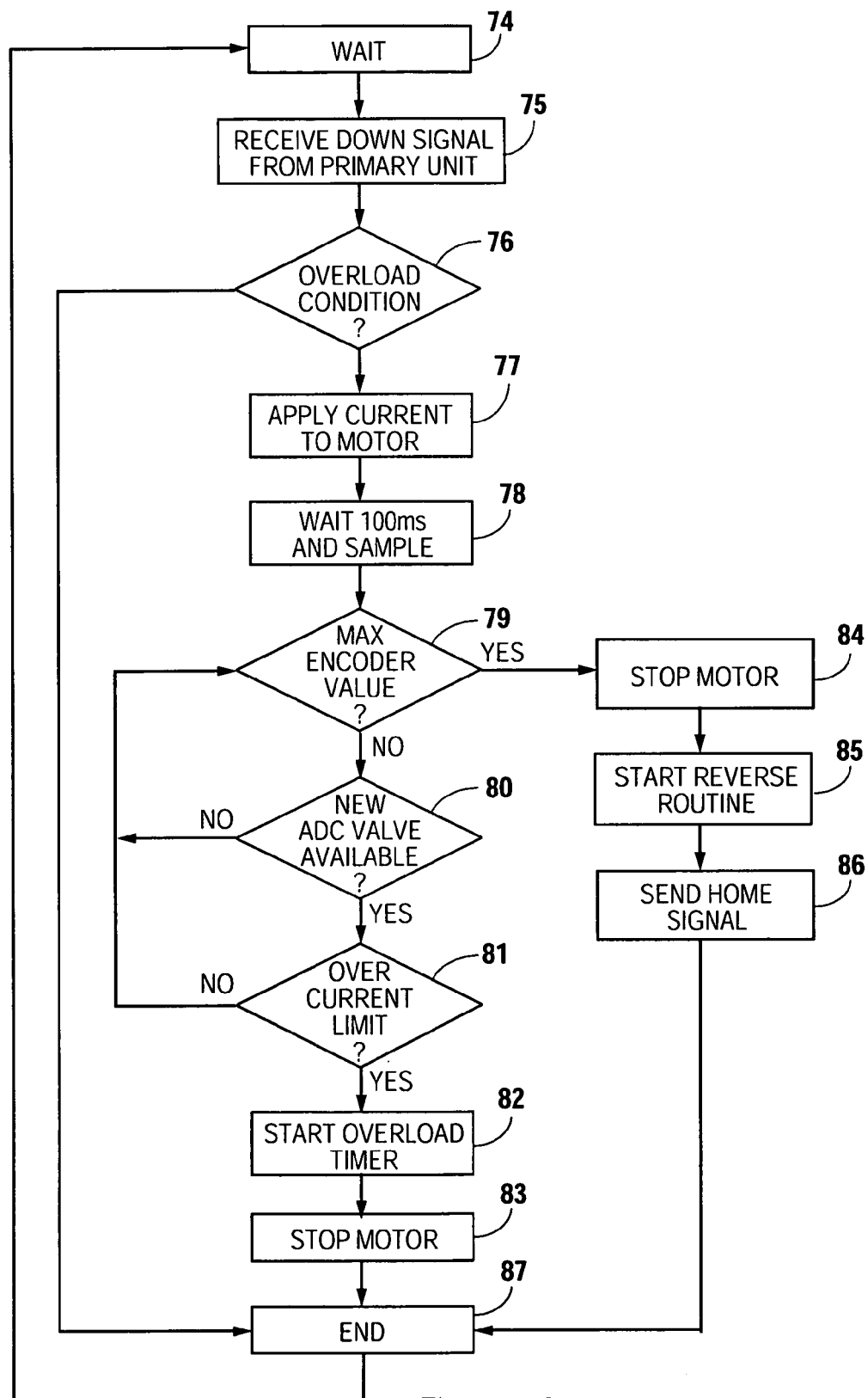
FIG. 10b is a method flowchart of the current monitoring operations of the product dispenser according to the preferred embodiment.

As shown in FIG. 10b, step 74, the microcontroller 192 of the product dispenser 10 waits for a down signal from the primary device. Once a down signal is received from the primary device, step 75, the microcontroller 192 verifies that the process is not currently in an overload condition, step 76. If the process is currently in an overload condition, then the process moves to step 87, the end, where the process will loop back to step 74, where it waits for a next down signal. If the process is not currently in an overload condition in step 76, the processor commences to apply current to the driver as shown in step 77. After a predetermined interval, one hundred milliseconds in this preferred embodiment, the microcontroller 192 samples the voltage across the shunt resistor 341 as shown in step 78. In step 79, the microcontroller 192 compares the encoder 340 count to a maximum encoder 340 count. If the encoder 340 count is equal to the maximum encoder 340 count, then the microcontroller 192 determines that the package 210 is empty, and the process moves to step 84, where the driver is stopped. A reverse routine is started in step 85 to move the evacuation member 133 to the home position. Step 86 provides for sending the primary device a signal indicating that the evacuation is in the home position. The process would then move to step 87, the end.

If the encoder 340 count is less than the maximum encoder 340 value, the process moves to step 80, where, the microcontroller 192 looks for a new analog to digital converted voltage value sample. If there is not a new sample, the processor 192 returns to step 79. If there is a new value, the processor 192 moves to step 81, where it determines is there is in over current situation. If the voltage sample is less than the maximum allowable voltage, then the microcontroller 192 proceeds back to step 79, where it checks the encoder 340 value and the application of current to the driver 185 continues. If the voltage sample is greater than or equal to the maximum allowable voltage, then the microcontroller 192 proceeds to step 82, where it starts the overload timer, two seconds in this preferred embodiment. The microcontroller 192 then moves to step 83 where the application of current to the driver 185 is stopped. The microcontroller 192 then moves to step 87, the end, where the process loops back to step 74.

The amount of force required to move the evacuation member 133 from the top of the dispensing station 110 to the bottom of the dispensing station 110 may vary due to manufacturing tolerances. Accordingly, there is a need to characterize the frictional forces inherent to the design of the product dispenser. The control system provides the ability to electronically compensate for varying amounts of friction at different points of the evacuation member's travel in each individual dispensing station 110.

The evacuation member 133 is instructed to move downward at a prescribed velocity. Voltage readings are then taken at multiple points along the evacuation member's 133 path in each individual dispensing station 110. The voltage readings provide a correlation to the force required to move the evacuation member 133 at each sample point. Once the voltage required is characterized, a corresponding voltage profile is then created. The voltage profile represents the voltage required to move the evacuation member 133 from the top of the dispensing station 110 to the bottom of the dispensing station 110 at a predetermined velocity. Once the dispensing station 110 is characterized, the controller 192 can then apply the voltage profile, as well as an exact additional voltage to a product package 210 during evacuation. Calibration of this type ensures that the same loads are applied to each product package 210.

After the dispensing station 110 is characterized, a carrier 120 containing a product package 210 may be loaded into the dispensing station 110 for evacuation. The evacuation member 133 remains at the top of the dispensing station 110, until a dispense command is initiated. The evacuation member 133 then moves downward to pressurize the product package 210. The evacuation member 133 will continue to move downward until a predetermined voltage is achieved. In this preferred embodiment, the predetermined voltage includes the voltage in the voltage profile that corresponds to the location of the evacuation member 133 plus the voltage to be applied to the product package 210 to move product towards the product package 210 opening.

Figure 10C:
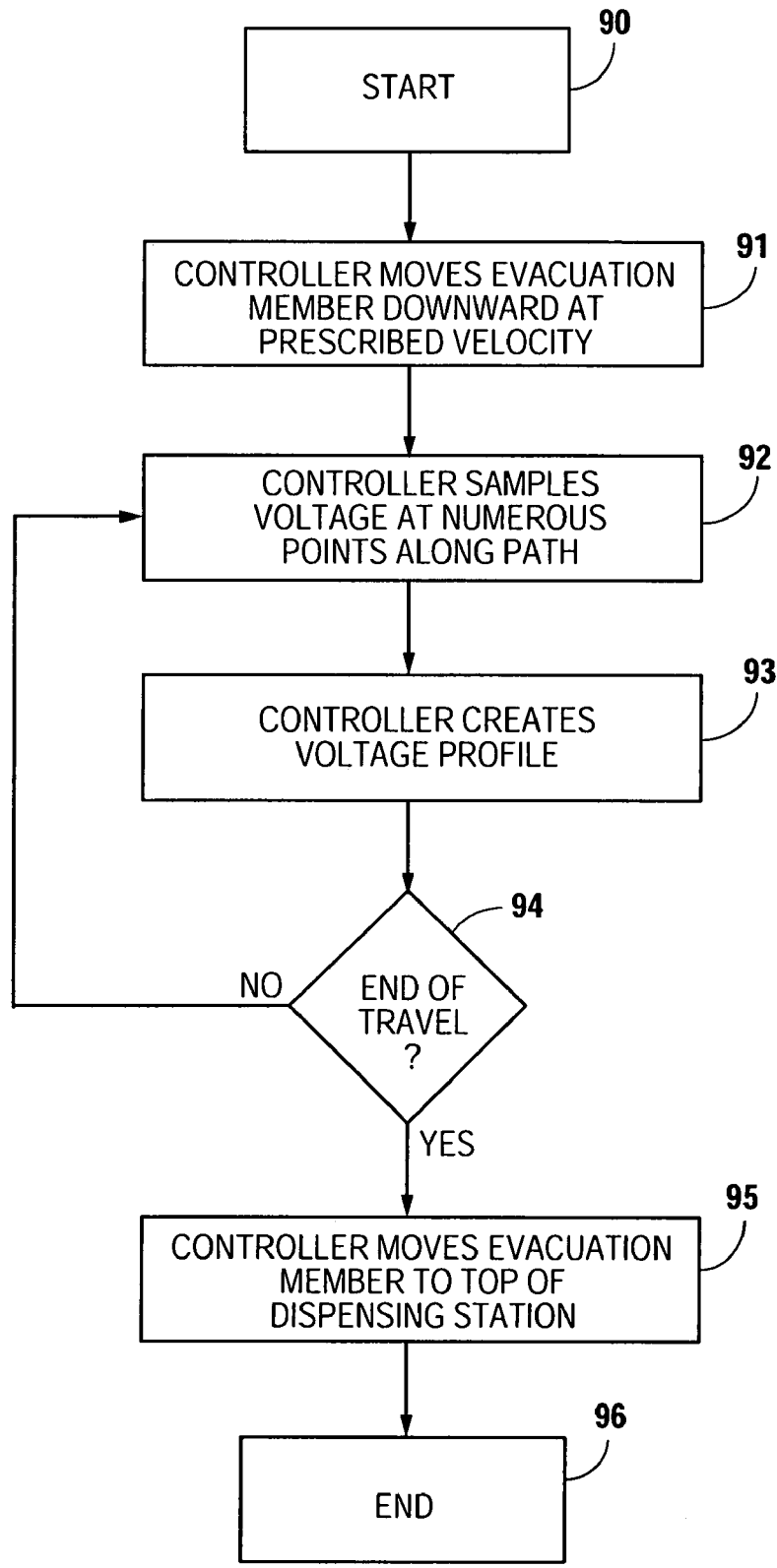
FIG. 10c is a method flowchart for characterizing a drive of a dispensing station according to the preferred embodiment.

FIG. 10c provides a method flowchart for characterizing a drive of a dispensing station 110. The process commences with step 90, wherein the characterization process is started by an operator's signal. Once the start signal has been received, the process moves to step 91, wherein the controller 192 moves the evacuation member 133 downward at a constant velocity. The controller 192 then samples the voltage required to move the evacuation member 133 at the predetermined velocity, step 92 and creates a voltage profile for the various points along the evacuation member travel path.

In step 94, the controller 192 determines if the evacuation member 133 is at the bottom end of the travel path. If the evacuation member 133 is not at the end of the travel path, then the process returns to step 92, to continue sampling of the voltage points. If the evacuation member 133 is at the end of the travel path, then the process moves to step 95, wherein the controller 192 returns the evacuation member 133 to the top of the dispensing station 110. The process then moves to step 96, the end and returns to normal dispensing operations.

Figure 11A:
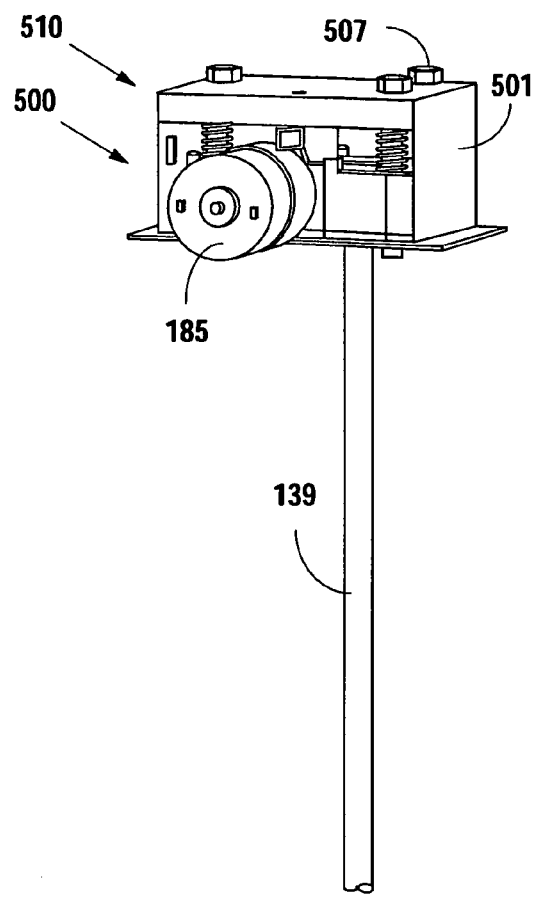
FIG. 11a is a perspective view of a driver assembly using a microswitch for maximum package load sensing.
Figure 11B:
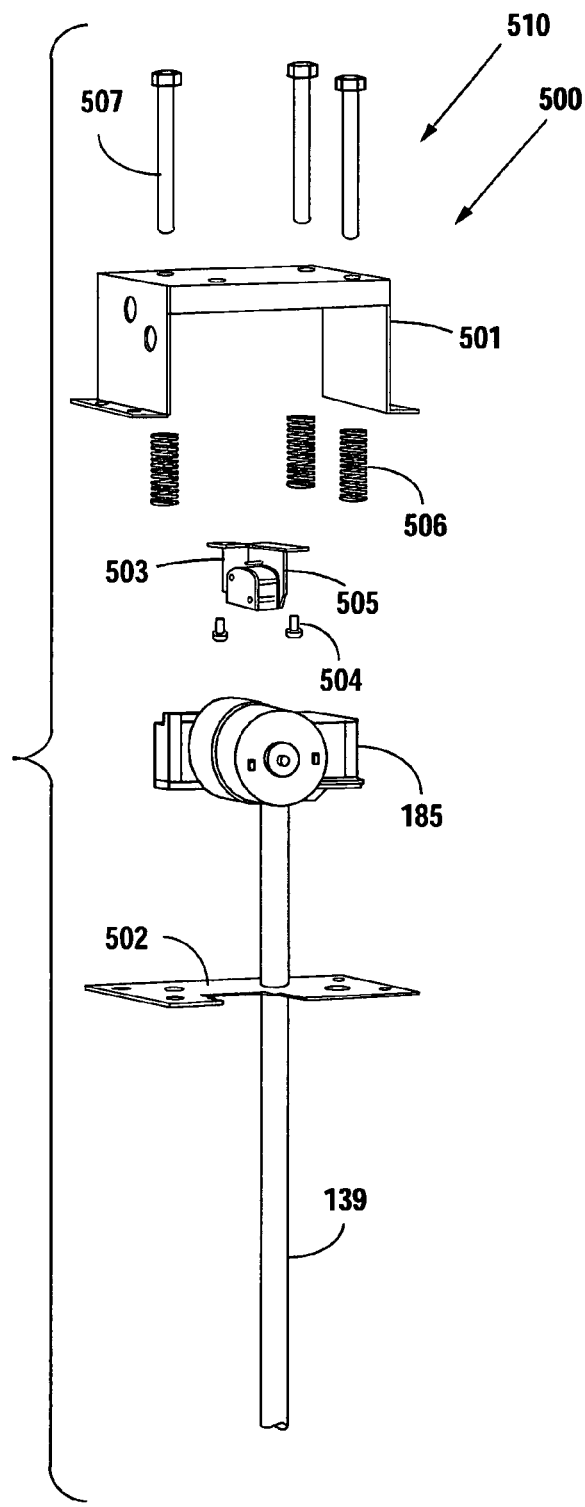
FIG. 11b is an exploded view of the driver assembly using a microswitch for maximum package load sensing.

In a second embodiment for determining the required position of the evacuation member 133, a package motor assembly 510 is used to ascertain when the evacuation member 133 has applied sufficient pressure to the package 210. The package motor assembly 510, as shown in FIGS. 11a-11b, includes an enclosure 500, a driver 185 and a microswitch 505. The enclosure 500 includes a top cover 501, a bottom cover 502 and a plurality of shoulder bolts 507. In this embodiment, the driver 185 is housed in the enclosure 500 restrained by a plurality of shoulder bolts 507. The enclosure 500 mounts onto the mid plate 105 in the area where the driver 185 currently is mounted. The driver 185 resides inside of the enclosure 500 and is mounted on shoulder bolts 507, wherein the driver 185 is able to slide vertically against a plurality of springs 506. The package motor 185 is connectable to the threaded shaft 139 as in the preferred embodiment. This embodiment further includes a microswitch 505 attached to a bracket 503 and mounted on the inside of the top cover 501 with a set of screws 504.

In the nominal position, there is a separation between the driver 185 and the microswitch 504. During a dispense, the microcontroller 192 provides current to the driver 185 to turn the threaded shaft 139, thereby moving the evacuation member 133 down to properly evacuate the package 210. Upon the evacuation member 133 reaching the limit of its travel downward, the continued application of current to the driver 185 continues to turn the threaded shaft 139. The threaded shaft 139 cannot force the evacuation member 133 downward any further, and the threaded shaft 139 begins to move upward due to the threads spinning through the drive nut 161. This upward movement of the threaded shaft 139 forces the driver 185 to move up the shoulder bolts 507, thereby forcing the driver 185 to press against the microswitch 504. This action triggers the microswitch 504, thereby breaking the current to the driver 185.

Figures 12A, 12B:
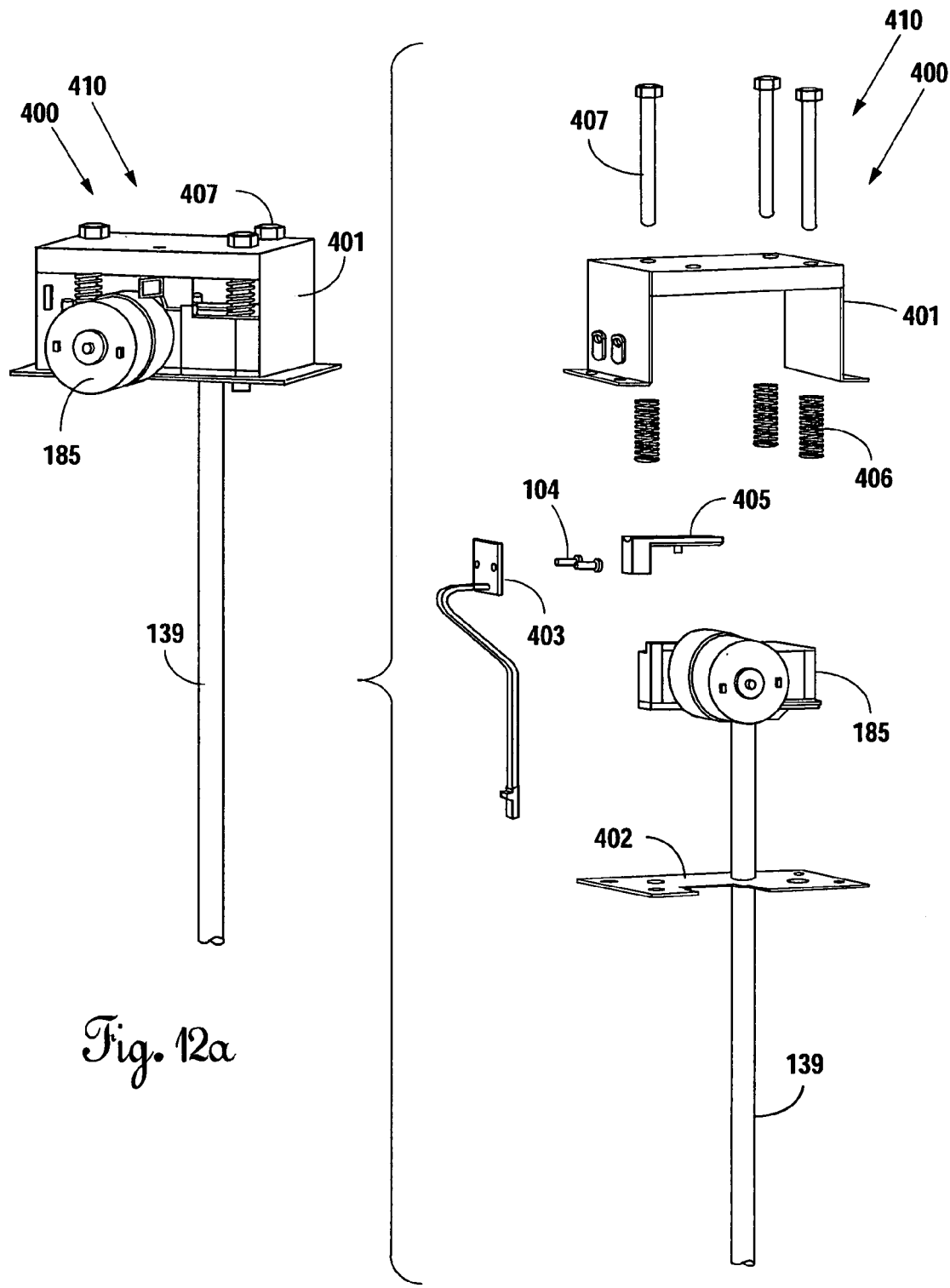
FIG. 12a is a perspective view of a driver assembly using a hall effect sensor for maximum package load sensing.
FIG. 12b is an exploded view of the driver assembly using a hall effect sensor for maximum package load sensing.

In a third embodiment for determining the required position of the evacuation member 133, a package motor assembly 410 is used to ascertain when the evacuation member 133 has applied sufficient pressure to the package 210. In this embodiment, as shown in FIGS. 12a-12b, the package motor assembly 410 includes a driver 185, an enclosure 400 and a hall-effect sensor 403. The enclosure 400 includes a top cover 401, a bottom cover 402, a plurality of shoulder bolts 407 and a plurality of springs 406. The shoulder bolts 407 restrain the top cover 401 and the bottom cover 402. The enclosure 400 mounts onto the mid plate 105 in the area where the driver 185 currently is mounted. The driver 185 resides inside of the enclosure 400 and is mounted on the shoulder bolts 407, wherein the package motor 185 is able to slide vertically. The driver 185 is connectable to the threaded shaft 139 as in the preferred embodiment. This embodiment further includes a magnet 405 attached to the driver 185 and a hall effect sensor 403 mounted on the inside of the top cover 401 with a set of screws 404.

In the nominal position, the hall effect sensor 403 and the magnet 405 are aligned, therein informing the microcontroller 192 that the evacuation member 133 is in a home position. During a dispense, the microcontroller 192 provides current to the driver 185 to turn the threaded shaft 139, thereby moving the evacuation member 133 down to properly evacuate the package 210. Upon the evacuation member 133 reaching the limit of its travel downward, the continued application of current to the driver 185 continues to turn the threaded shaft 139. The threaded shaft 139 cannot force the evacuation member 133 downward any further, and the threaded shaft 139 begins to move upward due to the threads spinning through the drive nut 161. This upward movement of the threaded shaft 139 forces the driver 185 to overcome the spring 406 force, and move up the shoulder bolts 407, thereby forcing the hall effect sensor 403 and the magnet 405 to separate. This separation causes the current across the hall effect sensor 403 to change, therein flagging the microcontroller 192.

A fourth method for determining the required position of the evacuation member 133 includes the use of encoders 340 to inform the microcontroller 192 of the driver 185 rotations, thereby providing the microcontroller 192 with information to derive the location of the evacuation member 133. In this case, the distance between the home position and an empty package position is known. The vertical distance from the home position to the package 210 empty position is broken into ten zones. Each zone represents one tenth of the package 210 volume as it is evacuated, and has a characteristic displacement distance value per pump 220 cycle. As product is dispensed, the primary device informs the product dispenser 10 of the dispense operations, and the product dispenser 10 then provides current to the driver 185 and the evacuation member 133 begins to move from its current position downward to the package 210 position at zone displacement per pump cycle rates.

In an alternative embodiment, the product dispenser 10 may be used as a stand-alone dispenser. In cases where a pump 220 is not required, the product dispenser 10 may be used as outfitted. Adaptations to the software would likely be required to move all method steps and processes that are needed to the microcontroller 192. In cases where the product dispenser 10 is used as a stand alone unit requiring diluent control for mixing and dispensing operations, all hardware including the diluent solenoids, regulators, and the control hardware can be moved from the primary device to the product dispenser 10, therein providing the stand alone unit with all required functions.

Figure 13A:
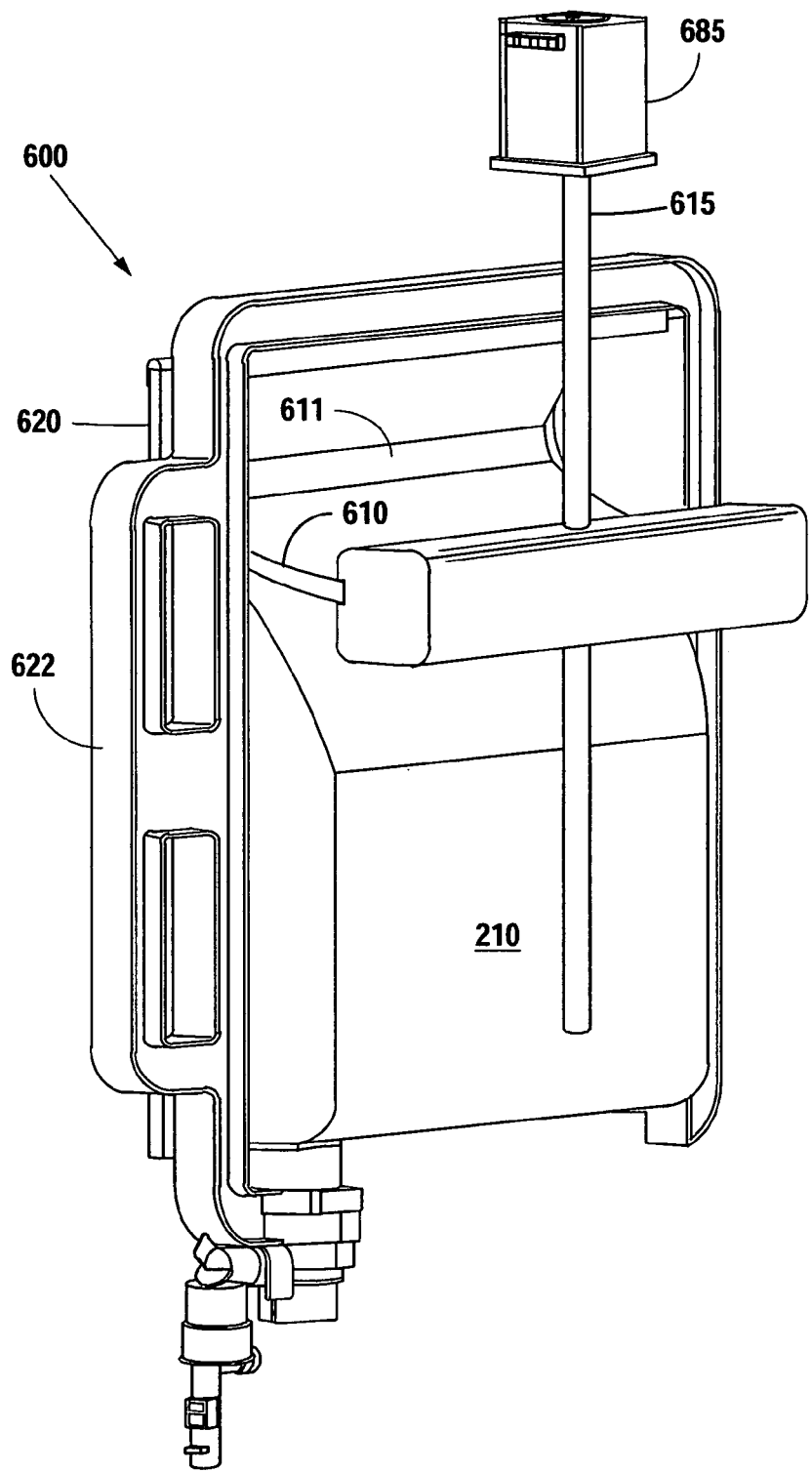
FIG. 13a is a perspective view of a single squeegee unit according to an alternative embodiment.
Figure 13B:
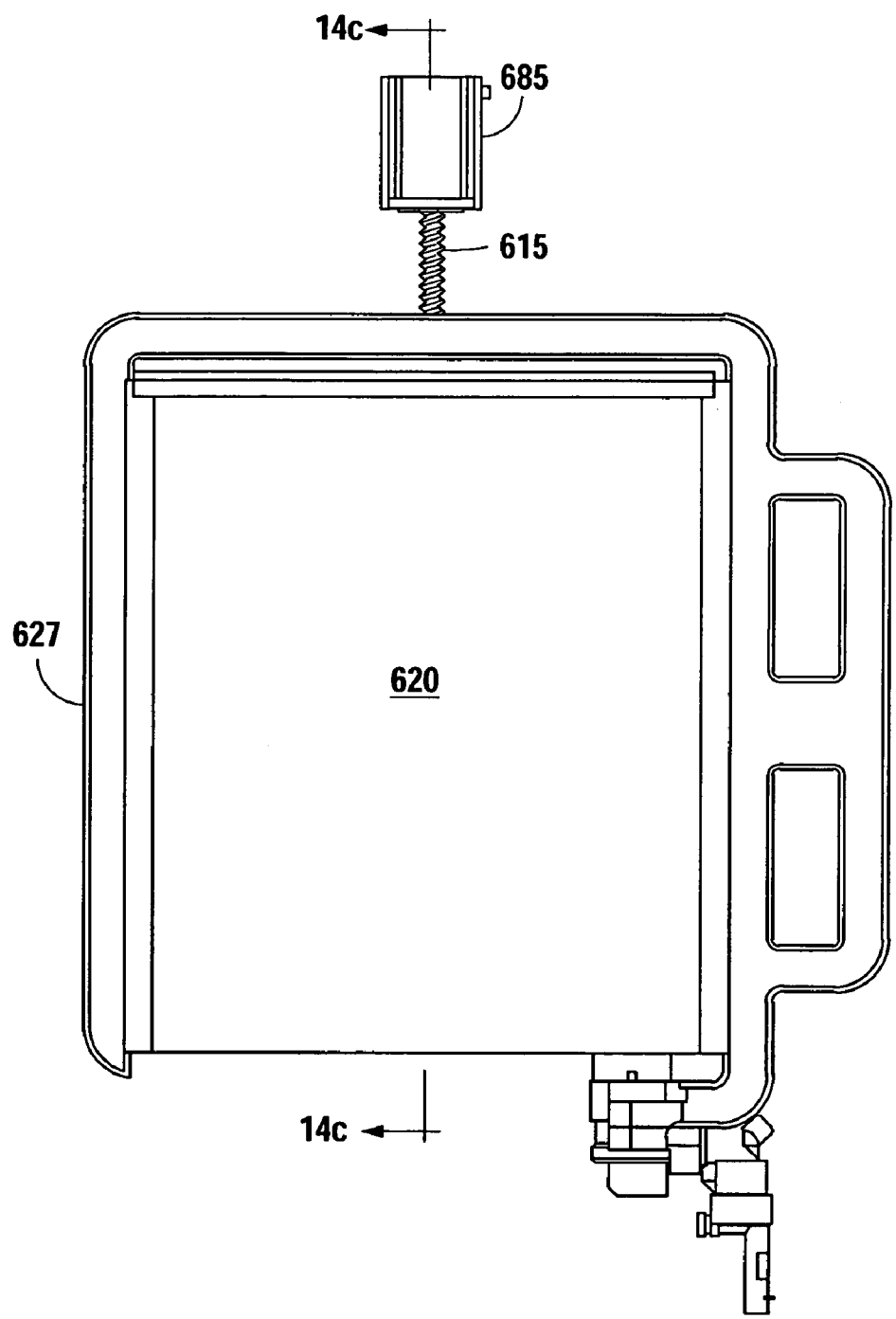
FIG. 13b provides a side view of the single squeegee unit according to the alternative embodiment.
Figure 13C:
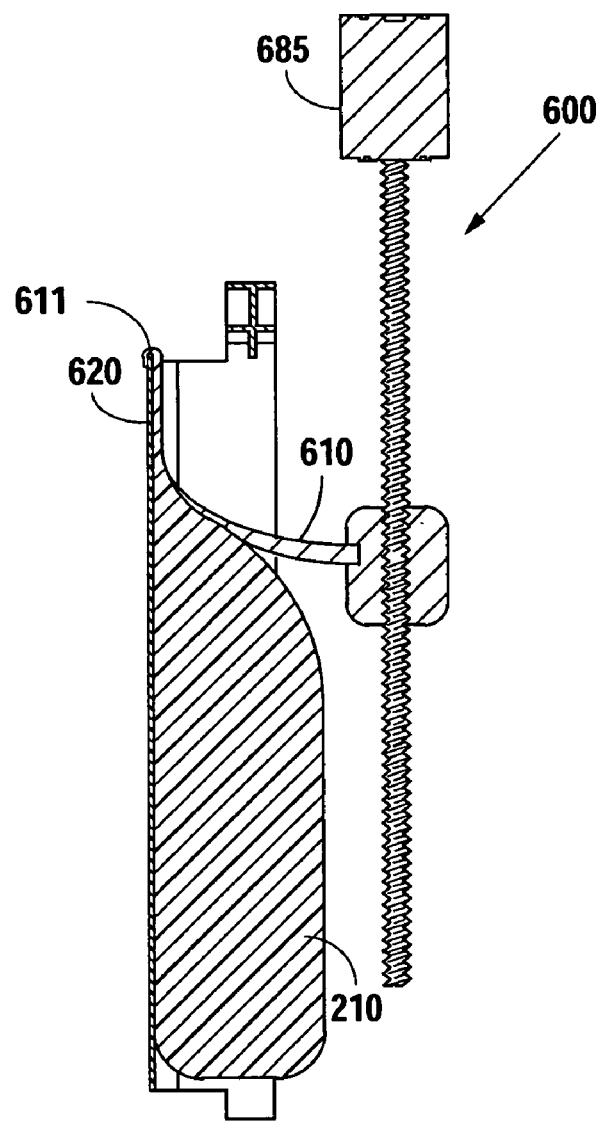
FIG. 13c provides a section view of the single squeegee unit according to the alternative embodiment.

Alternatively, the evacuation system may be tailored to varying products. As such, the backing plate assembly 130 and the evacuation member 133 may be replaced with squeegees, rollers and variations thereof. In a second embodiment, the backing plate assembly 130 is replaced with a single squeegee unit 600 as shown in FIGS. 13a-13c. The single squeegee unit 600 may include a product carrier 622, a squeegee 610, a threaded rod 615 and a bearing surface 620. In this configuration, the squeegee 610 is mounted to the threaded rod 615 such that the squeegee 610 will travel upwards or downwards as the threaded rod 615 is rotated by a driver 685. The squeegee 610 is located such that the squeegee 610 swipes the bearing surface 620 in an upward or downward direction.

FIG. 13b provides a side view of the product carrier 622 and driver 685 assembly. The section view of FIG. 13c indicates how the squeegee 610 can move product in a package 210 downward to a pump or outlet. It should be clearly evident to one skilled in the art that the backing plate assembly 130 of the preferred embodiment could be substituted with the squeegee unit 600 to evacuate the product package 210.

In operation, the squeegee 610 is positioned above a product package 210 mounting area. An upper end 611 product package 210 is then mounted onto the bearing surface 620. The squeegee 610 is then moved down and applies a pressure on the product package 210. As product is dispensed, the squeegee unit 600 operates in conjunction with a control system similar to the control system previously disclosed in the preferred embodiment. The squeegee 610 continues to apply pressure to the product package 210 and continues to move downwards until the product package 210 is emptied. As the product package 210 is pressurized by the squeegee 610, the product package 210 may be evacuated using any suitable product pump or a "no pump" embodiment may be utilized. After the product package 210 is emptied, the squeegee 610 returns to the position above the product package 210 to facilitate a product package 210 changeout.

Figure 14A:
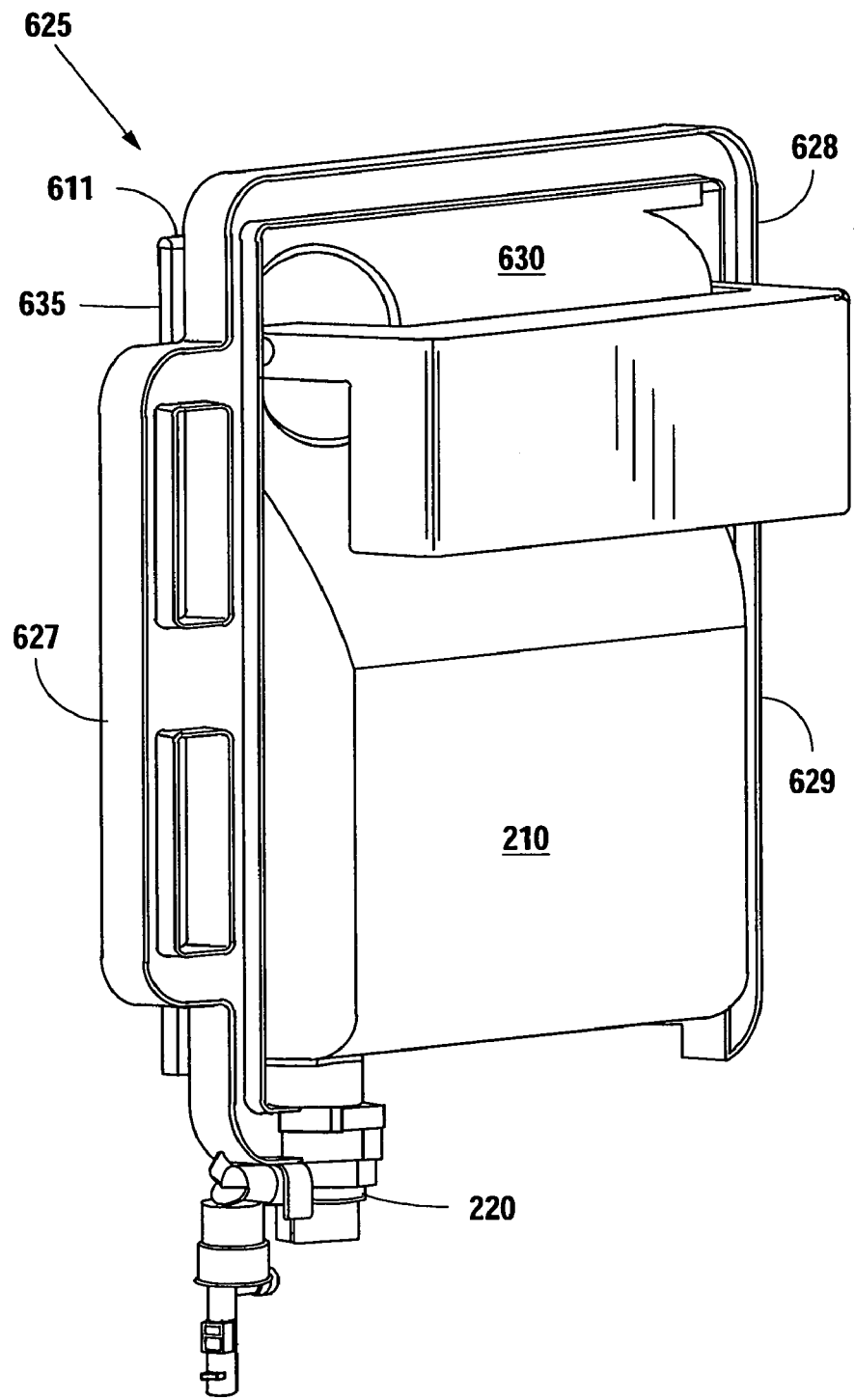
FIG. 14a provides a perspective view of a single weighted roller unit according to an alternative embodiment.

In a third embodiment, the evacuation system 100 may be outfitted with a single weighted roller unit 625 as shown in FIGS. 14a-14c. The single weighted roller unit 625 may include a carrier 627, a single weighted roller 630, a restraint device such as a cable and a track 629 and a bearing surface 635. In this configuration, each end of the roller 630 is connected to a suitable restraint device, such that the weighted roller 630 is able to move up and down along the bearing surface 635. The bearing surface 635 may be any suitable flat structure to support a product package 210 and the weighted roller 630.

In operation, an upper end 611 of the product package 210 is mounted to an upper end 628 of the carrier 627. The product package 210 hangs from the upper end 628 and is in communication with the bearing surface 635. The single weighted roller 630 is then lowered down from the upper end 628 of the carrier 627, such that gravitational forces pull the weighted roller 630 downward, therein displacing product in the product package 210. As the single weighted roller 630 moves downward, the product package 210 becomes pressurized as the weighted roller 630 forces the product into a smaller package volume. Once the product package 210 is pressurized, it may be evacuated with any suitable pump or a non-pump embodiment.

As the product is dispensed from the product package 210, the weighted roller 630 moves downward until the product package 210 is empty. Once empty, the single weighted roller 630 may be moved back to the upper end 628 of the carrier 627 to facilitate a product package 210 changeout. The weighted roller 630 may be moved to the upper end 628 either manually or with assistance such as a motor and cable retraction scheme. It should be further evident to one skilled in the art that the weighted roller unit 625 could be used with the control systems disclosed in this description.

Figure 15A:
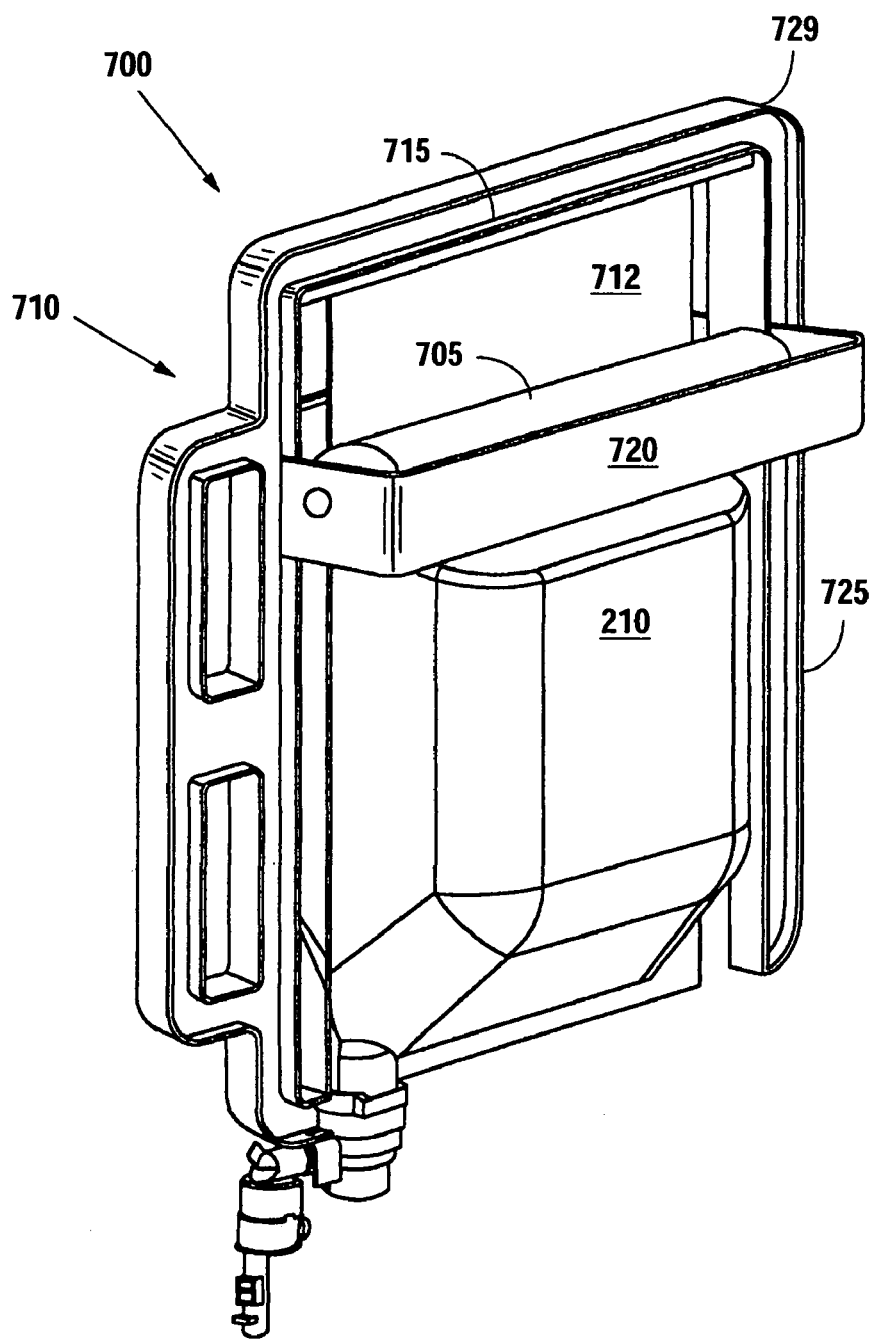
FIG. 15a provides a perspective view of a double roller evacuation unit according to an alternative embodiment.
Figures 15B, 15C:
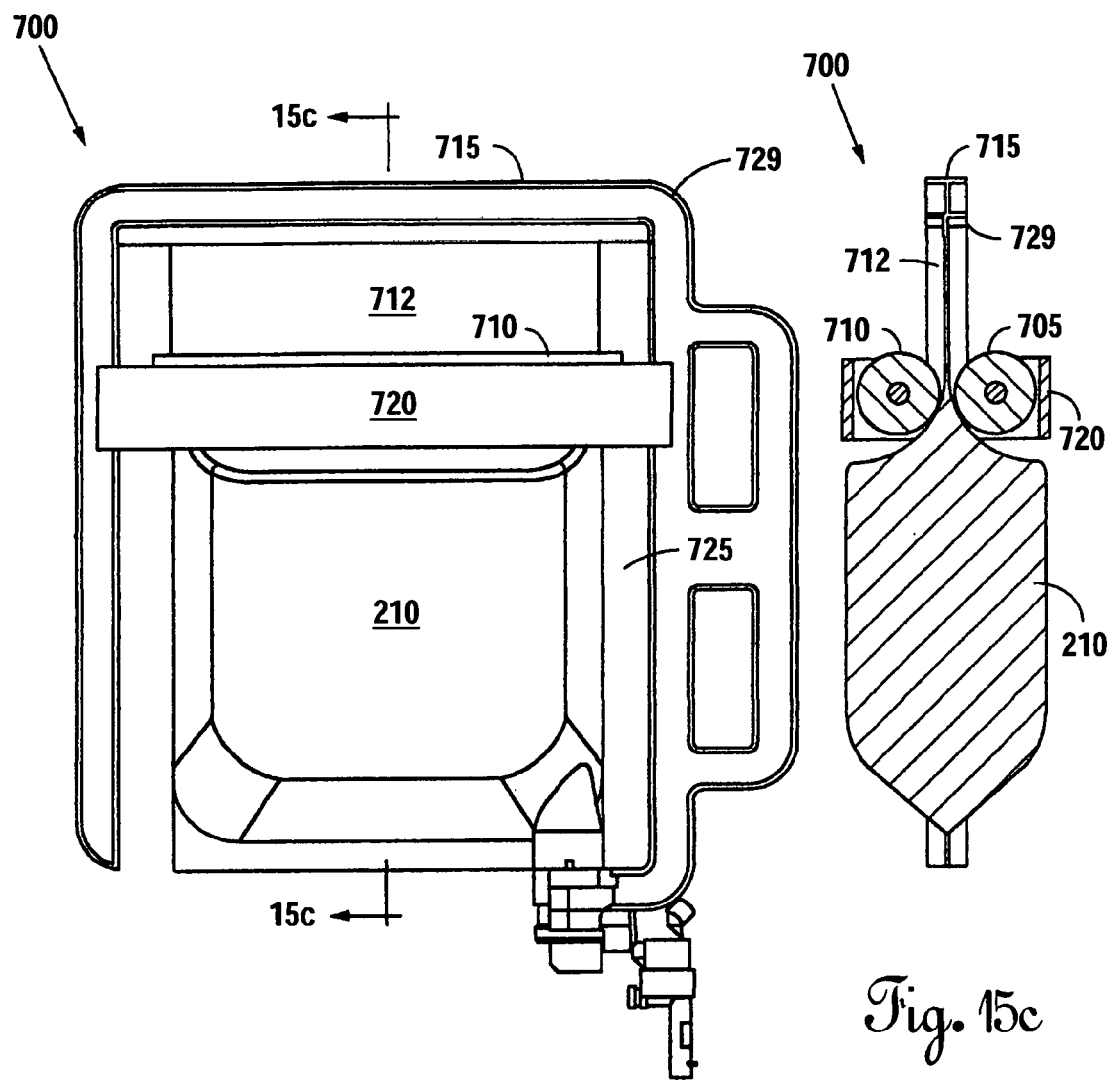
FIG. 15b provides a side view of the double roller evacuation unit according to the alternative embodiment.
FIG. 15c provides a section view of a double roller evacuation unit according to the alternative embodiment.

In a fourth embodiment, the backing plate assembly 130 may be replaced with a double roller evacuation unit 700 as shown in FIGS. 15a-15c. The double roller evacuation unit 700 includes a first roller 705, a second roller 710 and a carrier frame 715. The rollers are suitably mounted on the carrier frame 715 to allow a product package 210 to pass between the two rollers. As a first end 712 of the product package 210 passes between the two rollers, product is forced into a portion of the product package 210 that has not passed between the rollers. Since the product is now in a smaller volume, the product package 210 becomes pressurized. The first and second rollers 705 and 710 may have provisions to allow for fluctuations in product particle sizes, such as slight travel away from each other or spring loaded rollers. The roller frame 715 includes a frame track 725 used to restrict the roller bracket 720 to vertical motion. As the product package 210 is pressurized when the rollers are in an engaged position, it should be clear to one skilled in the art that any suitable pump or non-pump embodiment may be used to evacuate the product package 210.

In operation, one end of a product package 210 is mounted to an upper end 729 of the carrier frame 715. The product package 210 hangs from the upper end 729 of the carrier frame 715 and the two rollers are lowered down such that gravitational forces pull the rollers and the roller frame 720 downward against the product package 210. As the rollers move downward, the product package 210 becomes pressurized as the rollers are forcing the product into a smaller package volume. Once the product package 210 is slightly pressurized, it may be evacuated with any suitable pump or a non-pump embodiment may be used. As the product is dispensed from the product package 210, the weighted rollers moves downward until the product package 210 is empty. Once empty, the rollers may be moved back to the upper end 729 of the roller frame 715 to facilitate a product package 210 changeout. The rollers may be moved to the upper end 729 either manually or with assistance such as a motor and cable retraction scheme. It should be further evident to one skilled in the art that the rollers could be used with the control systems disclosed in this description.

Control of the double roller evacuation unit 700 may be through the use of weighted rollers, wherein the weight of the roller pair is able to move the product to the lower portions of the product package 210. The double roller evacuation unit 700 may also be driven similarly to the evacuation member 133, wherein a microcontroller 192 monitors the current on a driver 185 to ensure that the maximum squeeze force applied to the product package 210 does not damage the product package 210.

Figure 16A:
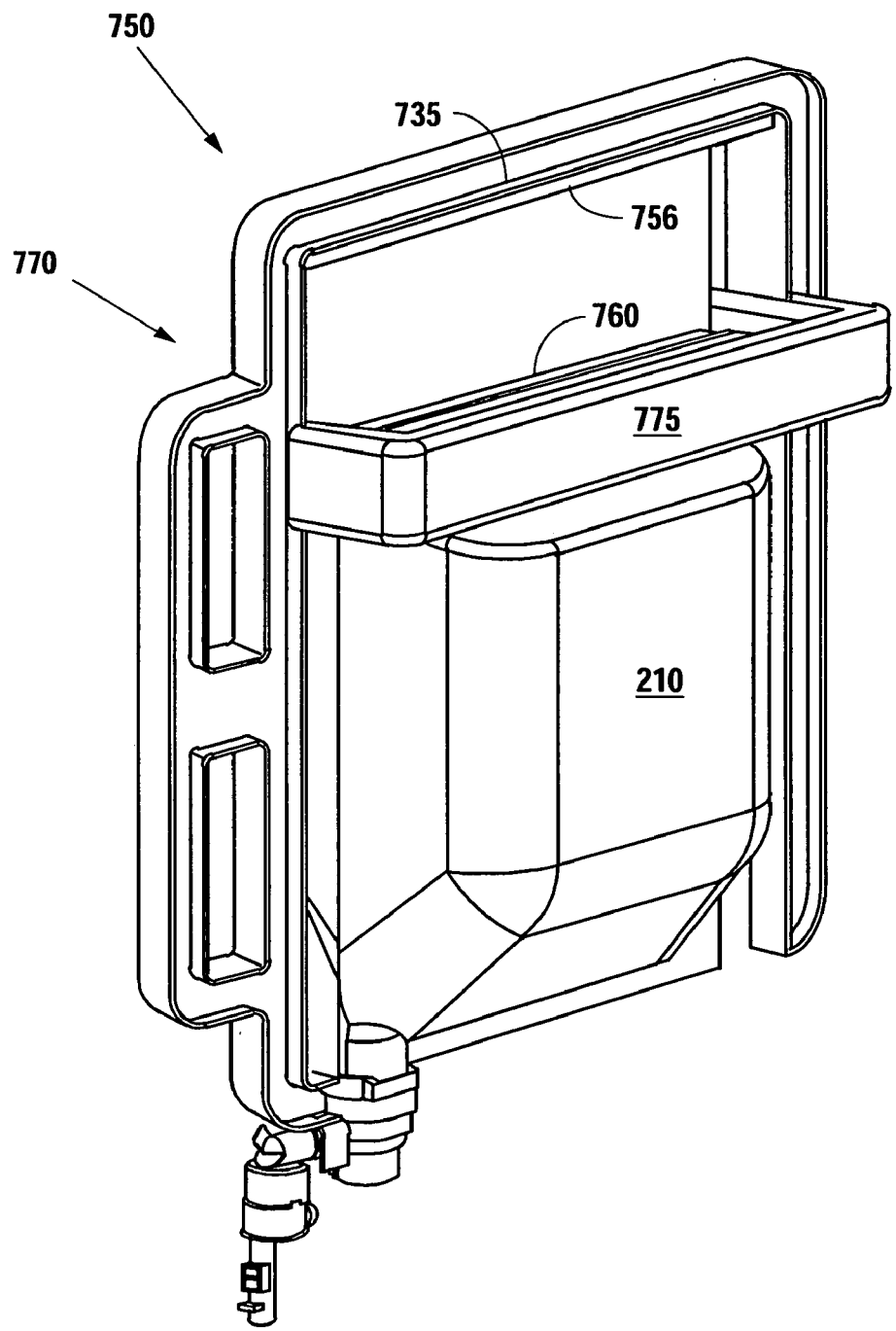
FIG. 16a provides a perspective view of a double squeegee unit according to an alternative embodiment.
Figures 16B, 16C:
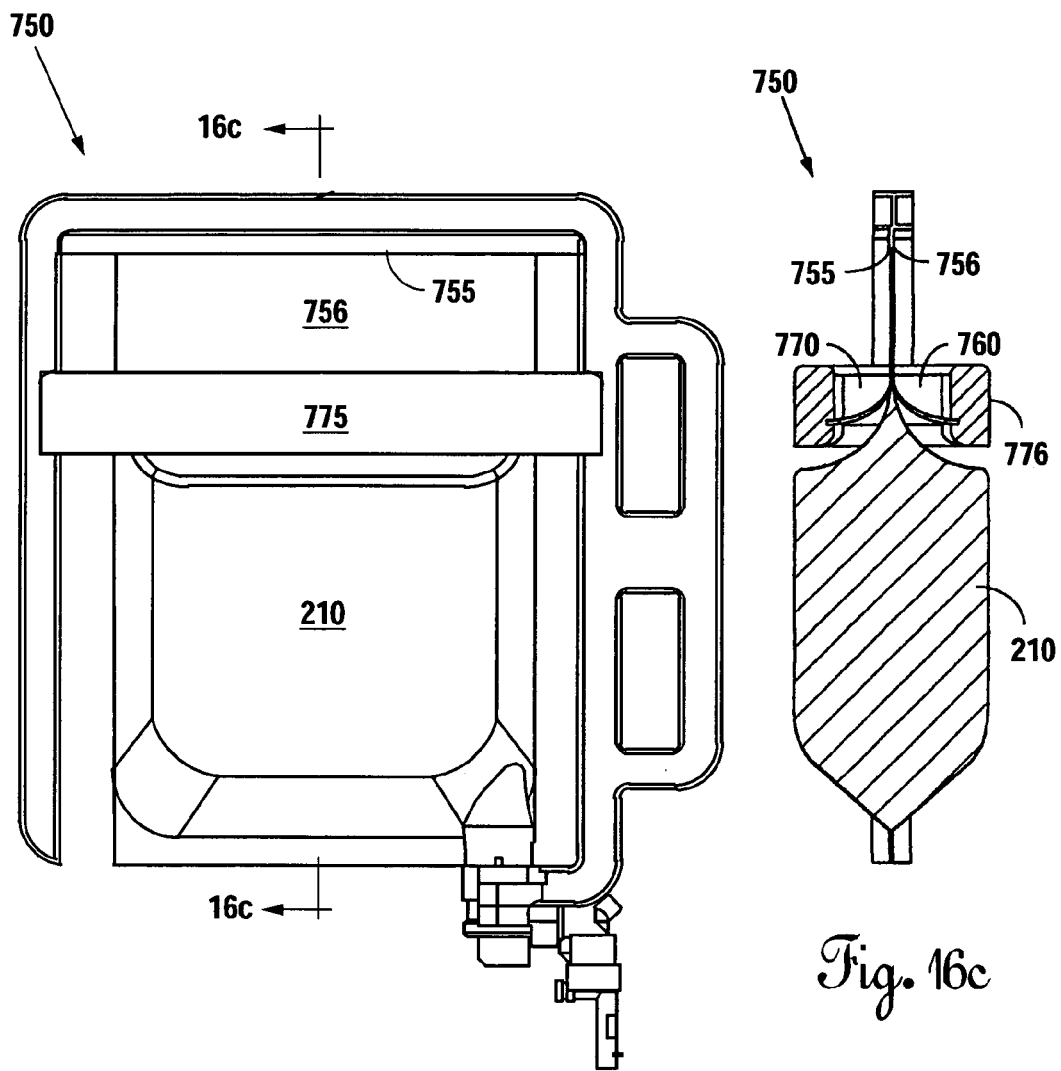
FIG. 16b provides a side view of the double squeegee unit according to the alternative embodiment.
FIG. 16c provides a section view of a double squeegee unit according to the alternative embodiment.

In a fifth embodiment, a double squeegee unit 750 may be utilized to replace the backing plate assembly 130 and the evacuation member 133 as shown in FIGS. 16a-16c. The double squeegee unit 750 may include a package hanger 755, a squeegee frame 775, a first squeegee 760 and a second squeegee 770. In this embodiment, an upper end 756 of the product package 210 is inserted through the squeegees mounted in the squeegee frame 775 and connected to the package hanger 755. The assembly of the product package 210 and the package hanger 755 may then be placed inside of a dispensing station 110 of the preferred embodiment. As the product package 210 is supported from above, the product moves to the lower end of the product package 210. The first squeegee 760 and the second squeegee 770 are mounted in the squeegee frame 775, such that they swipe the part of the product package 210 passing between them. Clearances between the two squeegees may be adjustable through the use of springs or the like. It should be clear to one skilled in the art that clearances between the squeegees may vary with product consistency and particle sizes.

As this embodiment may fit within the dispensing station 110 of the preferred embodiment, it should be clear to one skilled in the art that the double squeegee unit 750 may be operated through the use of a powered motor drive or through gravitational forces. The powered motor drive would be essentially identical to the one disclosed herein. A double squeegee unit 750 powered by gravitational forces would require a squeegee frame 775 of a predetermined size and weight to guarantee displacement of product, approximately eighteen pounds in this preferred embodiment.

In operation, the product package 210 is suspended to provide a resistance to the first and second squeegees 760 and 770 swiping the product package 210. When the product package 210 is suspended, the product not near the packaging film moves toward the bottom of the product package 210. The first squeegee 760 and the second squeegee 770 are simultaneously moved from the upper end 756 of the product package 210 towards a lower end of the product package 210. Once the product package 210 is empty, the squeegee frame 775 may be lifted or retracted for a product package 210 changeout.

Figure 17A:
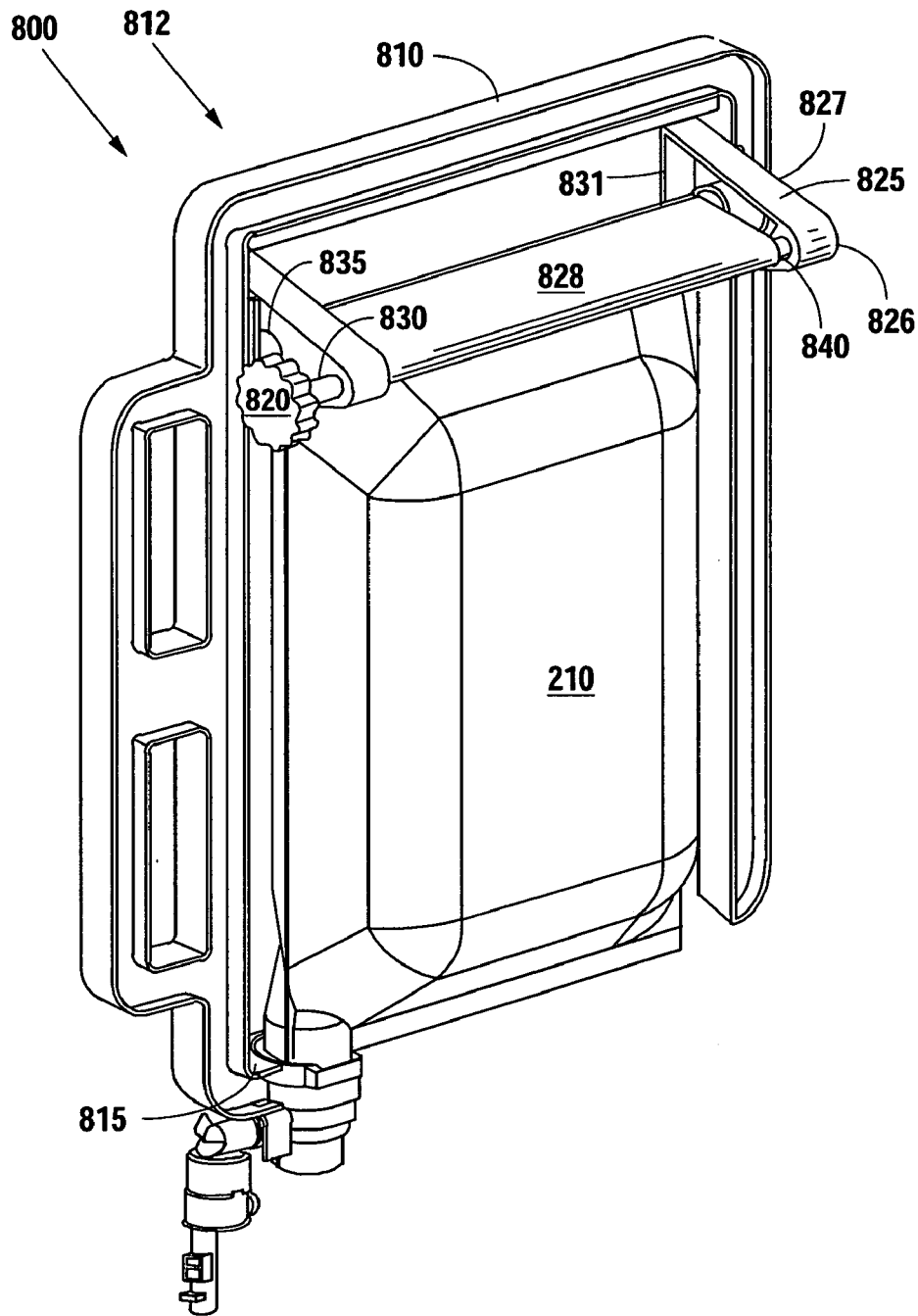
FIG. 17a provides a perspective view of a roller/drag bar evacuation unit according to an alternative embodiment.
Figure 17B:
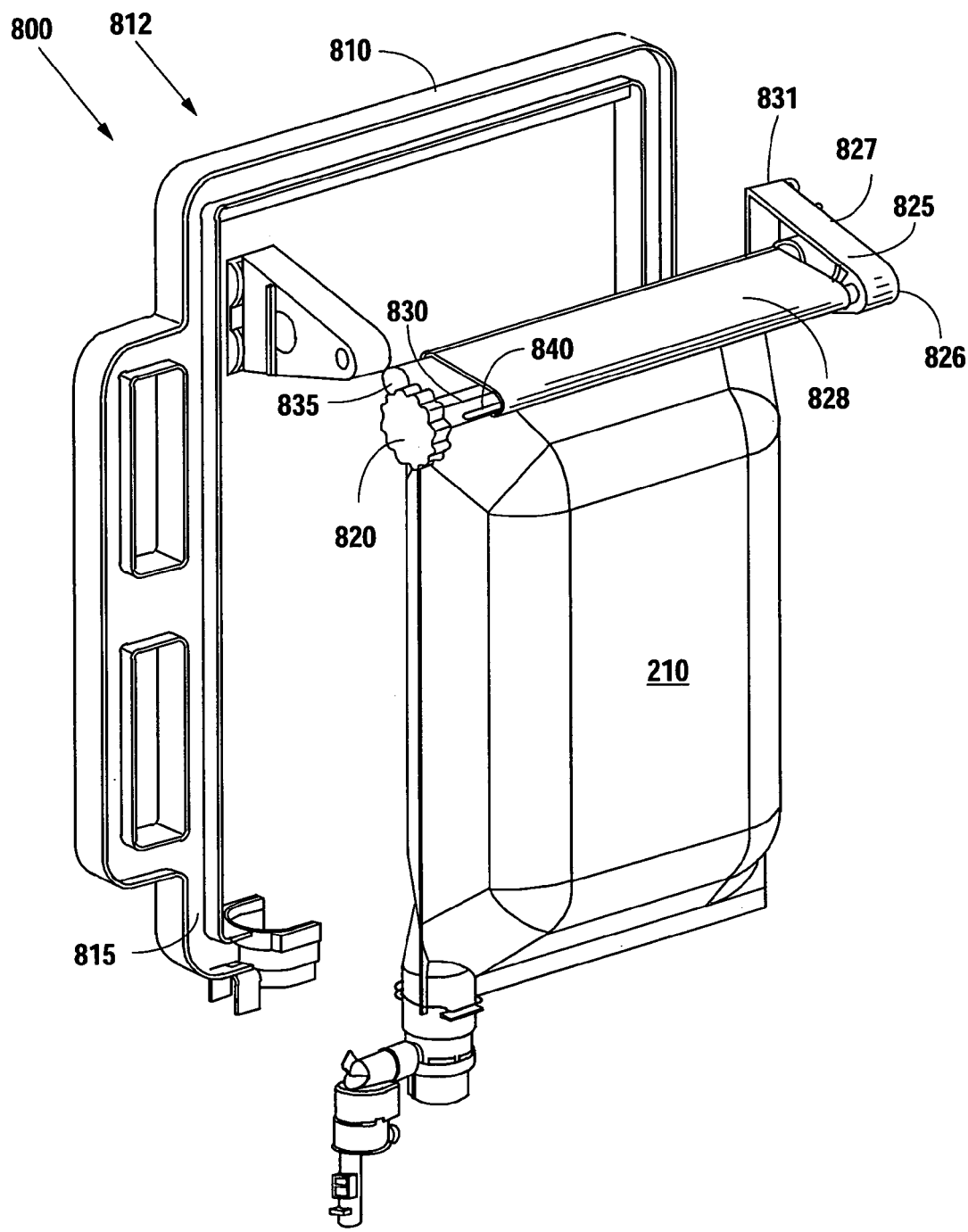
FIG. 17b provides an exploded view of the roller/drag bar evacuation unit according to the alternative embodiment.

In a sixth embodiment, a roller/drag bar evacuation unit 800 as shown in FIGS. 17a-17b may be used to replace the backing plate assembly 130 and the evacuation member 133 of the preferred embodiment. The roller/drag bar evacuation unit 800 may include a carrier frame 810 and a roller frame assembly 812. The roller frame assembly 812 includes two roller frames 825, a shaft 830, a handle 820 and a drag bar 835. The roller frames 825 include apertures 826 to accommodate the shaft 830 and apertures 827 to accommodate the drag bar 835. The shaft 830 fits within the apertures 826 and protrudes from the roller frame 825. The handle 820 is mounted on an end of the shaft 830 to provide for turning the shaft 830. The drag bar 835 fits within the apertures 827 of the roller frames 825. The roller frames 825 include a flat portion 831 adaptable to a roller frame track 815 on the carrier frame 810. Therein, the roller frames 825 are able to move upward and downward on the carrier frame 810.

In operation, an upper end 828 of a product package 210 is slipped over the drag bar 835 and connected to the shaft 830. Connection to the shaft could be accomplished through various methods, including feeding the end 828 of the package 210 through a slot 840 in the shaft and turning the shaft until the product package 210 overlaps and locks it into place, or the like. Turning of the handle 820 and the shaft 830 causes the package 210 to be moved over the drag bar 835, therein moving the product in the product package 210 downward in the package 210.

Regardless of the mounting method, the roller frame assembly 812 will move down the tracks 815 as the handle 820 and shaft are turned. Continued turning will further roll up the product package 210, thereby forcing the product package 210 contents to move toward a pump or package opening. The process of using this embodiment includes having an operator turn the handle on a regular basis to ensure that the package 210 is pressurized.

In use, an operator would feed the upper end 828 of the product package 210 and secure it to the shaft 830. The operator would then rotate the handle 820 to cause the package 210 to overlap and then load the carrier frame 810 into the product dispenser 10. The operator would continue to turn the handle 820 until the package 210 is pressurized. The operator would then have to prime the pump. One primed, the product dispenser 10 would be ready to dispense product. Throughout dispensing, the operator would be required to further turn the handle 820 to further reduce the package 210 volume. Once empty, the carrier frame 810 and package 210 may be removed from the product dispenser 10 for changeout. It should be clear to one skilled in the art that this process could be automated and a current sensing regime similar to the one disclosed herein could be utilized.

As this invention has been shown in various configurations, the control system further provides the ability to electronically measure the amount of friction inherent to each individual drive system. The amount of friction in each individual drive system may vary due to manufacturing tolerances. As such, there is a need to determine the voltage necessary to overcome the inherent frictional forces. Once the frictional characteristics of each individual drive system have been measured, then the controller 192 can apply an exact additional load to a product package 210 by increasing the voltage applied by the voltage required to overcome the inherent frictional forces. Calibration of this type ensures that the same loads are applied to each product package 210.

Although the present invention has been described in terms of the foregoing preferred embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

We claim:

1. A method of eliminating an unrecoverable portion of a product package, comprising:
   a. inserting a product package containing a product into a package support of a package carrier, such that an unrecoverable portion of the product package abuts with a recessed pinch-off area of the package support; and
   b. closing a restraining support of the package carrier, such that a pinch-off face of the restraining support abuts with the recessed pinch-off area of the package support, thereby forcing product to move from the unrecoverable portion to a recoverable portion of the product package.

2. The method of eliminating an unrecoverable portion of a product package, according to claim 1, wherein the recessed pinch off area and the pinch off face are angled toward a product package opening.

3. The method of eliminating an unrecoverable portion of a product package according to claim 2, further comprising:
   c. moving the product toward the product package opening as the product moves downward.

4. The method of eliminating an unrecoverable portion of a product package according to claim 1, wherein the unrecoverable portion is disposed between the recessed pinch off area and the pinch off face, and further wherein product is forced from between the recessed pinch-off area and the pinch off face as the recessed pinch off area and the pinch off face come together, thereby pinching off the unrecoverable portion after it has been evacuated.

* * * * *